US012720219B2

(12) United States Patent
Matsumoto

(10) Patent No.: US 12,720,219 B2
(45) Date of Patent: Aug. 25, 2026

(54) IMAGE SENSOR AND ELECTRONIC CAMERA

(71) Applicant: NIKON CORPORATION, Tokyo (JP)

(72) Inventor: Shigeru Matsumoto, Sagamihara (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 18/224,848

(22) Filed: Jul. 21, 2023

(65) Prior Publication Data

US 2023/0362512 A1 Nov. 9, 2023

Related U.S. Application Data

(63) Continuation of application No. 17/373,146, filed on Jul. 12, 2021, now abandoned, which is a continuation of application No. 16/498,484, filed as application No. PCT/JP2018/013270 on Mar. 29, 2018, now abandoned.

(30) Foreign Application Priority Data

Mar. 29, 2017 (JP) ................................ 2017-065777

(51) Int. Cl.
*H04N 25/445* (2023.01)
*H04N 25/78* (2023.01)

(52) U.S. Cl.
CPC ........... *H04N 25/445* (2023.01); *H04N 25/78* (2023.01)

(58) Field of Classification Search
None
See application file for complete search history.

(56) References Cited

U.S. PATENT DOCUMENTS 6,829,008 B1 * 12/2004 Kondo ..................... G02B 7/34 348/E3.018
2007/0188632 A1 8/2007 Kobayashi
2007/0285548 A1 * 12/2007 Gomi ..................... H04N 25/00 348/308

(Continued)

FOREIGN PATENT DOCUMENTS

JP 2006-319407 A 11/2006
JP 2010-157803 A 7/2010

(Continued)

OTHER PUBLICATIONS

Jun. 12, 2018 International Search Report issued in International Patent Application No. PCT/JP2018/013270.

(Continued)

*Primary Examiner* — Twyler L Haskins
*Assistant Examiner* — Wesley J Chiu
(74) *Attorney, Agent, or Firm* — Oliff PLC

(57) ABSTRACT

An image sensor, includes: a plurality of pixels arranged along both of a first direction and a second direction different from the first direction, each having a photoelectric conversion unit that generates an electric charge through photoelectric conversion of light; a plurality of signal lines disposed along the second direction, each connected to a plurality of pixels arranged along the first direction; and a control unit that executes control so as to output signals, (Continued)

each generated based upon the electric charge generated in the photoelectric conversion unit, to the signal lines different from one another.

20 Claims, 9 Drawing Sheets

(56) References Cited

U.S. PATENT DOCUMENTS

| | | | | |
|---|---|---|---|---|
| 2010/0163711 | A1 | 7/2010 | Kondo | |
| 2011/0273598 | A1 | 11/2011 | Ogino et al. | |
| 2012/0062772 | A1 * | 3/2012 | Osawa | H04N 25/40 348/300 |
| 2014/0014817 | A1 * | 1/2014 | Motonaga | H04N 25/46 250/208.1 |
| 2014/0048690 | A1 | 2/2014 | Oshikubo et al. | |
| 2014/0183332 | A1 * | 7/2014 | Theuwissen | H10F 39/803 250/208.1 |
| 2014/0333814 | A1 | 11/2014 | Tashiro | |
| 2015/0163430 | A1 * | 6/2015 | Kanemitsu | H04N 25/78 348/308 |
| 2016/0112614 | A1 * | 4/2016 | Masuda | H10F 39/8063 348/374 |
| 2017/0302872 | A1 | 10/2017 | Tanaka et al. | |
| 2018/0227551 | A1 | 8/2018 | Shishido | |
| 2018/0249099 | A1 * | 8/2018 | Kobayashi | H04N 25/75 |

FOREIGN PATENT DOCUMENTS

| | | | |
|---|---|---|---|
| JP | 2011-233949 | A | 11/2011 |
| JP | 2015-207948 | A | 11/2015 |
| WO | 2016/052219 | A1 | 4/2016 |

OTHER PUBLICATIONS

Sep. 18, 2020 Office Action Issued in U.S. Appl. No. 16/498,484.
Mar. 29, 2021 Office Action issued in Chinese Patent Application No. 201880022390.9.
Mar. 11, 2021 Office Action Issued in U.S. Appl. No. 16/498,484.
Nov. 9, 2021 Office Action issued in Japanese Patent Application No. 2019-510131.
Dec. 10, 2021 Office Action issued in Chinese Patent Application No. 201880022390.9.
Mar. 28, 2022 Office Action issued in Chinese Patent Application No. 201880022390.9.
Jul. 15, 2022 Office Action Issued in U.S. Appl. No. 17/373,146.
Feb. 24, 2023 Office Action issued In U.S. Appl. No. 17/373,146.
Jun. 6, 2023 Office Action issued in Japanese Patent Application No. 2022-073198.

* cited by examiner

1ST COLUMN 2ND COLUMN 3RD COLUMN 4TH COLUMN 5TH COLUMN 6TH COLUMN

1ST ROW 2ND ROW 3RD ROW 4TH ROW 5TH ROW 6TH ROW 7TH ROW 8TH ROW 9TH ROW 60 61 62 63 64 65 50

IMAGE SENSOR AND ELECTRONIC CAMERA

This is a Continuation of U.S. patent application Ser. No. 17/373,146 filed Jul. 12, 2021 (now abandoned), which is a Continuation of U.S. patent application Ser. No. 16/498,484 filed Sep. 27, 2019 (now abandoned), which is a National Stage of International Application No. PCT/JP2018/013270 filed Mar. 29, 2018, which claims priority from Japanese Patent Application No. 2017-065777 filed in Japan on Mar. 29, 2017. The entire disclosure of each of the above-identified prior applications is incorporated herein by reference.

TECHNICAL FIELD

The present invention relates to an image sensor and an electronic camera.

BACKGROUND ART

In an image-capturing device known in the related art, signals are output from a pixel unit in correspondence to individual rows (lines) (PTL 1). There is an issue yet to be addressed in the image-capturing device in the related art in that it is difficult to reduce readout time required for signal readout from the pixel unit.

CITATION LIST

Patent Literature

PTL 1: Japanese Laid Open Patent Publication No. 2011-233949

SUMMARY OF INVENTION

According to the first aspect of the present invention, an image sensor, comprises: a plurality of pixels arranged along both of a first direction and a second direction different from the first direction, each having a photoelectric conversion unit that generates an electric charge through photoelectric conversion of light; a plurality of signal lines disposed along the second direction, each connected to a plurality of pixels arranged along the first direction; and a control unit that executes control so as to output signals, each generated based upon the electric charge generated in the photoelectric conversion unit, to the signal lines different from one another.

According to the second aspect of the present invention, an image sensor, comprises: a plurality of pixels arranged along both of a first direction and a second direction different from the first direction, each having a photoelectric conversion unit that generates an electric charge through photoelectric conversion of light; a first signal line and a second signal line, disposed along the second direction, each connected to a plurality of pixels arranged along the first direction; a first connection unit that switches connection and disconnection between the first signal line and each of the plurality of pixels arranged along the first direction; and a second connection unit that switches connection and disconnection between the second signal line and at least one or more pixels among the plurality of pixels arranged along the first direction.

According to the third aspect of the present invention, an image sensor, comprises: a plurality of pixels arranged along both of a row direction and a column direction; signal lines each disposed in correspondence to a plurality pixels arranged along the column direction; and a readout unit that reads out pixel signals from the plurality of pixels to the signal lines, wherein: the readout unit is able to set a readout mode in which a single pixel signal is read out from a pixel block made up with pixels present over m rows×n columns (m is an integer equal to or greater than 1 and n is an integer equal to or greater than 2); and in the readout mode, n or fewer pixel signals originating from n or fewer pixel blocks set side-by-side along the column direction are read out to n or fewer signal lines different from one another among the signal lines.

According to the fourth aspect of the present invention, an electronic camera comprises the image sensor according to any one of the first through third aspects of the present invention; and an image generation unit that generates image data based upon signals from the pixels.

DESCRIPTION OF EMBODIMENTS

First Embodiment

Figure 1:
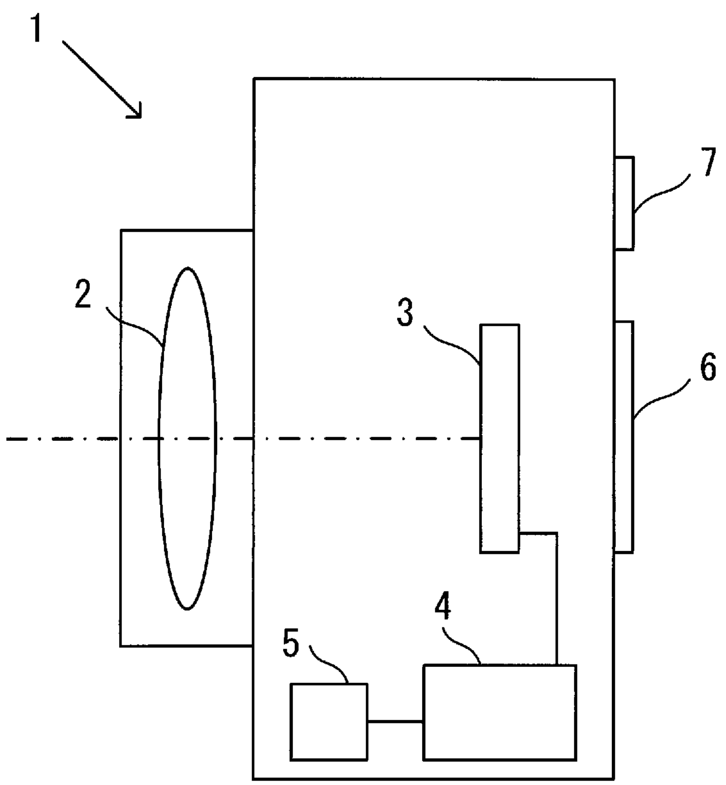
FIG. 1 A block diagram illustrating the structure of the image-capturing device according to a first embodiment FIG. 2 A block diagram illustrating part of the structure adopted in the image sensor according to the first embodiment FIG. 3 A circuit diagram illustrating the pixel structure adopted in the image sensor according to the first embodiment FIG. 4 A circuit diagram illustrating part of the structure adopted in the image sensor according to the first embodiment FIG. 5 A timing chart illustrating an example of an operation executed in the image sensor according to the first embodiment FIG. 6 A timing chart illustrating another example of an operation executed in the image sensor according to the first embodiment FIG. 7 A block diagram illustrating part of the structure adopted in the image sensor according to a second embodiment FIG. 8 A circuit diagram illustrating part of the structure adopted in the image sensor according to the second embodiment FIG. 9 A timing chart illustrating an example of an operation executed in the image sensor according to the second embodiment

FIG. 1 is a block diagram illustrating the structure of the image-capturing device according to the first embodiment. The image-capturing device in the first embodiment may be an electronic camera 1 (hereafter will be referred to as a camera 1) adopting a structure such as that shown in FIG. 1. The camera 1 comprises an image-capturing optical system (image forming optical system) 2, an image sensor 3, a control unit 4, a memory 5, a display unit 6 and an operation unit 7. The image-capturing optical system 2, which includes a plurality of lenses and an aperture, forms a subject image at the image sensor 3. It is to be noted that the image-capturing optical system 2 may be a detachable system that can be mounted at and dismounted from the camera 1.

The image sensor 3 may be, for instance, a CMOS image sensor. The image sensor 3 captures a subject image formed by the image-capturing optical system 2. As will be described in detail later, a plurality of pixels, each having a photoelectric conversion unit, are arranged in a two-dimensional array at the image sensor 3. The photoelectric conversion unit may be constituted with, for instance, a photodiode (PD). The image sensor 3 generates a pixel signal through photoelectric conversion of light having entered therein and outputs the pixel signal thus generated to the control unit 4. The pixel signal is generated based upon an electric charge resulting from photoelectric conversion at the photoelectric conversion unit.

The memory 5 may be, for instance, a recording medium such as a memory card. Image data and the like are recorded into the memory 5. Data are written into and read out from the memory 5 by the control unit 4. The display unit 6 displays, an image based upon image data, photographic information indicating the shutter speed, the aperture value, etc., a menu screen and the like. The operation unit 7, which includes a release button, various setting switches such as a power switch, and the like, outputs an operation signal corresponding to a given operation to the control unit 4.

The control unit 4, configured with a CPU, a ROM, a RAM and the like, controls various components of the camera 1 based upon a control program. The control unit 4 generates image data by executing various types of image processing on pixel signals output from the image sensor 3. In other words, the control unit 4 also functions as an image generation unit 4 that generates still image data and video image data based upon pixel signals. The various types of image processing include image processing of the known art such as gradation conversion processing, color interpolation processing and edge enhancement processing.

The control unit 4 executes processing through which pixel signals are read out from all the pixels at the image sensor 3 (first control mode) and processing through which some pixels (hereafter will be referred to as selection pixels), among all the pixels at the image sensor 3, are sequentially selected in units of individual rows, and pixel signals are read out from the selection pixels (second control mode). In addition, the control unit 4 executes processing through which pixel signals are read out by selecting, in sequence, selection pixels in units of a plurality of rows (third control mode). The control unit 4 executes processing in the first control mode when, for instance, executing a still image photographing operation so as to read out pixel signals from all the pixels. In addition, the control unit 4 executes processing in the second control mode or the third control mode when executing a video shooting operation so as to read out pixel signals from pixels in specific rows or columns among all the pixels.

Figure 2:
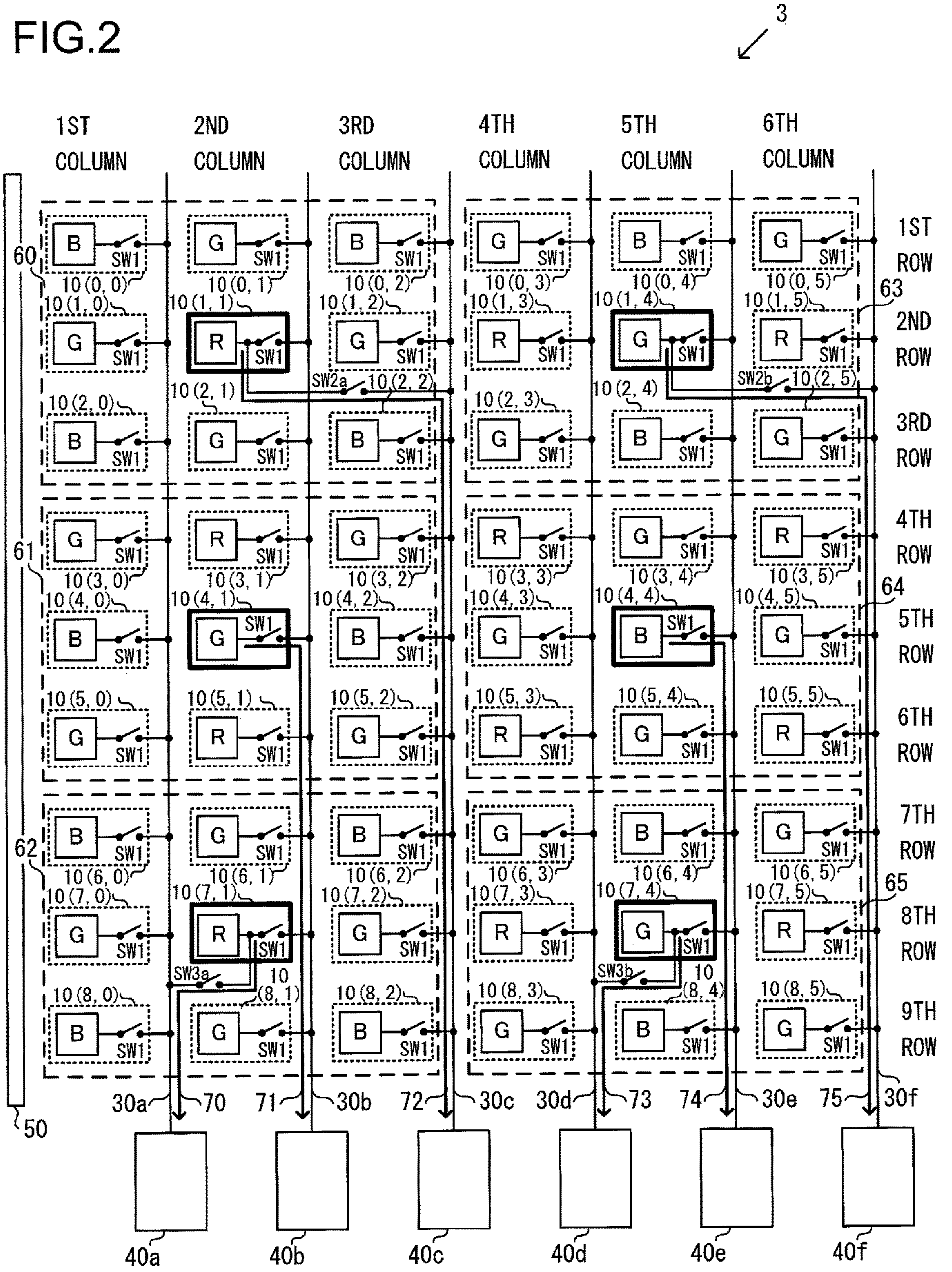

In reference to FIG. 2, the signal readout method adopted in the image sensor 3 according to the first embodiment will be explained. FIG. 2 is a block diagram illustrating part of the structure adopted in the image sensor 3 according to the first embodiment. As shown in FIG. 2, the image sensor 3 includes a plurality of pixels 10, a plurality of column circuit units 40 (column circuit unit 40*a* through column circuit unit 40*f*) and a vertical drive unit 50. The plurality of pixels 10 are arranged along a column direction in which columns extend (vertical direction), designated as a first direction, and along a row direction in which rows extend (horizontal direction), intersecting the column direction and designated as a second direction.

The pixels 10 each include a color filter achieving spectral sensitivity to one of three colors such as R (red) G (green) and B (blue). The image sensor 3 includes pixels each having an R color filter (hereafter will be referred to as R pixels) 10, pixels each having a G color filter (hereafter will be referred to as G pixels) 10 and pixels each having a B color filter (hereafter will be referred to as B pixels) 10. The R pixels 10, the G pixels and the B pixels 10 are arranged in a Bayer array. Namely, a pixel column with an R pixel 10 and a G pixel 10 arranged at alternate row positions and a pixel column with a G pixel 10 and a B pixel 10 arranged at alternate row positions are set side-by-side so as to take alternate column positions.

It is to be noted that while FIG. 2 only shows pixels 10 of six pixels in row direction×nine pixels in column direction so as to simplify the illustration, the image sensor 3 includes several million through several hundred million pixels, or an even greater number of pixels. In addition, FIG. 2 shows 54 pixels 10 including the pixel 10 located at the upper left corner, which is designated as a first row/first column pixel 10 (0, 0) and the pixel 10 located at the lower right corner designated as a ninth row/sixth column pixel 10 (8, 5). It is to be noted that the 54 pixels arranged over the six pixels in row direction×nine pixels in column direction shown in FIG. 2 represent a pixel group disposed in any area of the image-capturing surface of the image sensor 3 and that the first through sixth columns and the first through ninth rows in FIG. 2 are designated in correspondence to the 54 pixels 10. This means that pixels may be present further leftward relative to the pixels in the first column and further upward relative to the pixels 10 in the first row, as well as further rightward relative to the pixels 10 in the sixth column and further downward relative to the pixels 10 in the ninth row, at the image sensor 3.

Vertical signal lines 30 (vertical signal line 30*a* through vertical signal line 30*f*), each commonly connected to a plurality of pixels 10 disposed side-by-side along the first direction, i.e., along the column direction, are disposed so as to extend along the first direction at the image sensor 3. In other words, a plurality of vertical signal lines, each corresponding to a plurality of pixels arranged along the first direction, are arranged one after another along the second direction. In addition, a column circuit units 40 are disposed, each corresponding to each vertical signal line 30. Each of all the pixels 10 include a switch SW1 (notated as M4 in FIG. 3). Namely, switches SW1 are disposed so as to individually connect all the pixels 10 in the first column with the vertical signal line 30*a*, switches SW1 are disposed so as to individually connect all the pixels 10 in the second column with the vertical signal line 30*b*, and likewise, switches SW1 are disposed so as to individually connect all the pixels 10 in the subsequent third through sixth columns with the vertical signal lines 30*c* through 30*f* respectively.

In addition, a switch SW2*a* and a switch SW3*a* are disposed respectively in correspondence to the pixel 10 (1, 1) in the second row, and the pixel 10 (7, 1) in the eighth row, among the pixels 10 in the second column, at the image sensor 3. The switch SW2*a*, constituting a connection unit 2*a*, connects the pixel 10 (1, 1) with the vertical signal line 30*c*. The switch SW3*a*, constituting a connection unit 3*a*, connects the pixel 10 (7, 1) with the vertical signal line 30*a*. In addition, a switch SW2*b* and a switch SW3*b* are disposed respectively in correspondence to the pixel 10 (1, 4) in the second row and the pixel 10 (7, 4) in the eighth row, among the pixels 10 in the fifth column. The switch SW2*b*, constituting a connection unit 2*b*, connects the pixel 10 (1, 4) with the vertical signal line 30*f* The switch SW3*b*, constituting a connection unit 3*b*, connects the pixel 10 (7, 4) with the vertical signal line 30*d*. The switches SW2*a*, SW3*a*, SW2*b* and SW3*b* are each constituted with a transistor. It is to be noted that these switches SW2*a*, SW3*a*, SW2*b* and SW3*b* are used, i.e., set in an ON state, when the third control mode is selected.

Based upon a signal provided by the control unit 4 of the camera 1, the vertical drive unit 50 provides a drive signal øTX, a drive signal øRS, a drive signal øSEL to each pixel 10 as will be explained later, so as to control operations of the individual pixels 10. In addition, the vertical drive unit 50 provides signals to the switches SW2*a*, SW3*a*, SW2*b* and SW3*b* so as to control the ON/OFF states of the individual switches. The vertical drive unit 50 functions as a control unit 50 that controls the pixels 10 and the various switches and further functions as a readout unit 50 that reads out pixel signals from a pixel to a vertical signal line 30.

The column circuit units 40, each configured so as to include an analog/digital conversion unit (A/D conversion unit), converts signals input thereto from individual pixels 10 via the vertical signal lines 30 to digital signals and output the digital signals resulting from the conversion. The signals output from the column circuit units 40 are input to a signal processing unit (not shown) where they undergo signal processing such as correlated double sampling and signal level correction processing, and the signals having undergone the signal processing are output to the control unit 4 of the camera 1.

In case the first control mode is set by the control unit 4, the vertical drive unit 50 reads out pixel signals from all the pixels 10 at the image sensor 3. The vertical drive unit 50 selects, in sequence, pixels 10 at the image sensor 3 in units of individual rows starting with the pixels in the first row and moving toward those in the ninth row in FIG. 2, and reads out pixel signals from the selected pixels 10. The following is a more detailed description of the pixel signal readout method adopted in the first control mode.

The vertical drive unit 50 sets the switches SW1 in an ON state (connected state, electrically continuous state, shorted state) at the pixels 10 (0, 0) through 10 (0, 5) in the first row. The vertical drive unit 50 sets the switches SW1 in an OFF state (disconnected state, electrically discontinuous state, open state, cut-off state) at the pixels 10 in the rows other than the first row. It is to be noted that the switch SW2*a*, the switch SW2*b*, the switch SW3*a* and the switch SW3*b* are set in an OFF state in the first control mode.

Pixel signals generated at the pixels 10 (0, 0) through 10 (0, 5) in the first row are simultaneously read out, via the switches SW1 in the individual pixels 10, to the vertical signal line 30*a* through the vertical signal line 30*f* connected to the respective pixels 10. To describe this in further detail, the pixel signal from the pixel 10 (0, 0) is read out to the vertical signal line 30*a*, the pixel signal from the pixel 10 (0, 1) is read out to the vertical signal line 30*b* and the pixel signal from the pixel 10 (0, 2) is read out to the vertical signal line 30*c*. In addition, the pixel signal from the pixel 10 (0, 3) is read out to the vertical signal line 30*d*, the pixel signal from the pixel 10 (0, 4) is read out to the vertical signal line 30*e* and the pixel signal from the pixel 10 (0, 5) is read out to the vertical signal line 30*f*.

Once the pixel signals from the pixels 10 in the first row are read out, the vertical drive unit 50 sets the switches SW1 in an ON state at the pixels 10 (1, 0) through 10 (1, 5) in the second row. In addition, the vertical drive unit 50 sets the switches SW1 in an OFF state at the pixels 10 in the rows other than the second row. Pixel signals generated at the pixels 10 (1, 0) through 10 (1, 5) in the second row are simultaneously read out to the vertical signal line 30*a* through the vertical signal line 30*f*. Likewise, the pixels 10 in the third row through the ninth row are sequentially selected in units of individual rows and pixel signals from the pixels 10 are read out to the vertical signal lines 30 at the image sensor 3.

In the first control mode described above, the vertical drive unit 50 sequentially selects the pixels 10 at the image sensor 3 in units of individual rows and simultaneously reads out pixel signals from the pixels 10 in the selected row. The pixel signals sequentially read out from the pixels 10 first undergo signal processing via the column circuits 40 and the like and then are output to the control unit 4. The control unit 4 generates image data (e.g., still image data) by using the pixel signals originating at all the pixels 10, output from the image sensor 3.

In case the second control mode is set by the control unit 4, the vertical drive unit 50 reads out pixel signals by selecting selection pixels among all the pixels 10. Namely, the vertical drive unit 50 specifies pixels from which pixel signals are to be read out, among all the pixels 10. In more specific terms, the vertical drive unit 50 selects selection pixels by culling pixels in specific rows or columns among all the pixels 10 and reads out pixel signals from the selection pixels. In other words, the vertical drive unit 50 executes control for faster pixel signal readout in comparison to the first control mode through a culled readout.

The vertical drive unit 50 may select, for instance, the pixels 10 each enclosed by a bold-line frame in FIG. 2, i.e., the pixel 10 (1, 1), the pixel 10 (4, 1), the pixel 10 (7, 1), the pixel 10 (1, 4), the pixel 10 (4, 4) and the pixel 10 (7, 4), as selection pixels. In the example presented in FIG. 2, a selection pixel is specified at a ratio of one pixel in every nine pixels. To describe this in further detail, all the pixels in FIG. 2 are divided into a pixel block 60 through a pixel block 65, each made up with three×three=nine pixels and pixels taking matching positions within the individual pixel blocks are selected. In the present embodiment, the pixels 10 (1, 1), 10 (4, 1), 10 (7, 1), 10 (1, 4), 10 (4, 4) and 10 (7, 4) located at the central positions within the respective pixel blocks 60 through 65 are selected as the pixels taking matching positions within the pixel blocks. The selection pixels selected as described above form a Bayer array pattern. The vertical drive unit 50 reads out, in sequence, pixel signals from the selection pixels. Namely, it executes a 1/9 culled readout from pixels amounting to one ninth of all the pixels 10. The following is a detailed description of the pixel signal readout method adopted in the second control mode.

The vertical drive unit 50 sets the switches SW1 in an ON state at the pixel 10 (1, 1) and the pixel 10 (1, 4) in the second row. The vertical drive unit 50 sets the switches SW1 in an OFF state at the pixels 10 other than the pixel 10 (1, 1) and the pixel 10 (1, 4). It is to be noted that in the second control mode, the switch SW2*a*, the switch SW2*b*, the switch SW3*a* and the switch SW3*b* are set in an OFF state. The pixel signal from the pixel (1, 1) is read out to the vertical signal line 30*b* via the switch SW1 of the pixel 10 (1, 1), and at the same time, the pixel signal from the pixel 10 (1, 4) is read out to the vertical signal line 30*e* via the switch SW1 of the pixel 10 (1, 4).

Once the pixel signals from the pixel 10 (1, 1) and the pixel 10 (1, 4) are read out, the vertical drive unit 50 sets the switches SW1 in an ON state at the pixel 10 (4, 1) and the pixel 10 (4, 4) in the fifth row. The vertical drive unit 50 sets the switches SW1 in an OFF state at the pixels 10 other than the pixel 10 (4, 1) and the pixel 10 (4, 4). The pixel signal from the pixel 10 (4, 1) is read out to the vertical signal line 30*b* and at the same time, the pixel signal from the pixel 10 (4, 4) is read out to the vertical signal line 30*e*. Subsequently, selection pixels are selected in sequence in units of individual rows by skipping two rows, i.e., the pixels in the eighth row and the pixels in the 11th row are selected in units of individual rows and the pixel signals are read out from the selection pixels to the vertical signal lines 30.

In the second control mode described above, the vertical drive unit 50 selects selection pixels by culling pixels in specific rows or columns, among all the pixels 10 at the image sensor 3, and sequentially reads pixel signals from the selection pixels in units of row. The pixel signals from the selection pixels first undergo signal processing via the column circuits 40 and the like and then are output to the control unit 4. The control unit 4 generates image data (e.g. video image data) by using the pixel signals originating at the selection pixels, output from the image sensor 3.

In case the control unit 4 sets the third control mode, the vertical drive unit 50 selects selection pixels by culling pixels in specific rows or columns among all the pixels 10, same as in the second control mode. The vertical drive unit 50 may select, for instance, the pixels 10 each enclosed in the bold-line frame in FIG. 2, i.e., the pixel 10 (1, 1), the pixel 10 (4, 1), the pixel 10 (7, 1), the pixel 10 (1, 4), the pixel 10 (4, 4) and the pixel 10 (7, 4) as selection pixels, as in the second control mode.

In the second control mode described earlier, selection pixels are selected in units of single row and pixel signals are read out via vertical signal lines 30 disposed in correspondence to the selection pixels (the vertical signal lines 30*b* and 30*e* in the example presented in FIG. 2). This means that the vertical signal line 30*a*, the vertical signal line 30*c*, the vertical signal line 30*d* and the vertical signal line 30*f* are not used for pixel signal readout in the second control mode.

In the third control mode, the vertical drive unit 50 simultaneously (concurrently) reads out pixel signals from a plurality of selection pixels within a given column by using the vertical signal lines 30*a* through 30*f* In more specific terms, the vertical drive unit 50 simultaneously reads out the pixel signals from a plurality of selection pixels within the same column to vertical signal lines 30 different from one another by controlling the switch SW2*a*, the switch SW2*b*, the switch SW3*a* and the switch SW3*b*.

The vertical drive unit 50 reads out the pixel signal from a selection pixel (e.g., the pixel 10 (4, 1)) within one pixel block (e.g., the pixel block 61), among the three pixel blocks 60, 61 and 62 set consecutively along the column direction, to the vertical signal line 30*b* corresponding to the particular pixel. This signal is read out via the switch SW1. Concurrently with this signal readout, the vertical drive unit 50 reads out the pixel signals from the selection pixels (e.g., the pixels 10 (1, 1) and 10 (7, 1)) within the remaining two pixel blocks (e.g., the pixel blocks 60 and 62) among the three pixel blocks 60, 61 and 62, to the vertical signal lines 30*c* and 30*a* disposed next to the vertical signal line 30*b* to the left and to the right. These signals are read out respectively via the switch SW2*a* and the switch SW3*a*. Through these measures, the pixel signals from a plurality of pixels within a given column (e.g., the second column) can be simultaneously read out to different vertical signal lines.

The vertical drive unit 50 also simultaneously reads out the pixel signals from the selection pixels 10 (1, 4), 10 (4, 4) and 10 (7, 4) respectively present in the three pixel blocks 63, 64 and 65 set consecutively along the column direction, to the three vertical signal lines 30*d*, 30*e* and 30*f* in the same way as it reads out pixel signals from the selection pixels 10 (1, 1), 10 (4, 1) and 10 (7, 1) in the three pixel blocks 60, 61 and 62. Namely, the pixel signal from the selection pixel 10 (1, 4) is read out to the vertical signal line 30*f* via the switch SW2*b* and the pixel signal from the selection pixel 10 (4, 4) is read out to the vertical signal line 30*e* via the switch SW1 of the selection pixel 10 (4, 4). Likewise, the pixel signal from the selection pixel 10 (7, 4) is read out to the vertical signal line 30*d* via the switch SW3*b*. The following is a more detailed description of the pixel signal readout method adopted in the third control mode.

The vertical drive unit 50 sets the switch SW2*a* and the switch SW2*b* in an ON state. As a result, the pixel 10 (1, 1) becomes connected to the vertical signal line 30*c* via the switch SW2*a* and the pixel 10 (1, 4) becomes connected to the vertical signal line 30*f* via the switch SW2*b*. In addition, the vertical drive unit 50 sets the switches SW1 in an ON state at the pixel 10 (4, 1) and the pixel 10 (4, 4). As a result, the pixel 10 (4, 1) becomes connected to the vertical signal line 30*b* via the switch SW1 thereof and the pixel (4, 4) becomes connected to the vertical signal line 30*e* via the switch SW1 thereof.

Furthermore, vertical drive unit 50 sets the switch SW3*a* and the switch SW3*b* in an ON state. As a result, the pixel 10 (7, 1) becomes connected to the vertical signal line 30*a* via the switch SW3*a* and the pixel 10 (7, 4) becomes connected to the vertical signal line 30*d* via the switch SW3*b*. It is to be noted that the switches SW1 at the pixels 10 other than the pixel 10 (4, 1) and the pixel 10 (4, 4) are set in an OFF state. The vertical drive unit 50 connects the selection pixels 10 (1, 1), 10 (4, 1) and 10 (7, 1) in the pixel blocks 60, 61 and 62 to the vertical signal lines 30*c*, 30*b* and 30*a* respectively by controlling the ON/OFF states of the various switches as described above. In addition, the vertical drive unit 50 connects the selection pixels 10 (1, 4), 10 (4, 4) and 10 (7, 4) in the pixel blocks 63, 64 and 65 to the vertical signal lines 30*f*, 30*e* and 30*d* respectively.

The pixel signal from the pixel 10 (7, 1) is read out to the vertical signal line 30*a* through a path schematically represented by an arrow 70 in FIG. 2. The pixel signal from the pixel 10 (4, 1) is read out to the vertical signal line 30*b* as indicated by an arrow 71, and the pixel signal from the pixel 10 (1, 1) is read out to the vertical signal line 30*c* as indicated by an arrow 72. Likewise, the pixel signal from the pixel 10 (7, 4) is read out to the vertical signal line 30*d* as indicated by an arrow 73, the pixel signal from the pixel 10 (4, 4) is read out to the vertical signal line 30*e* as indicated by an arrow 74 and the pixel signal from the pixel 10 (1, 4) is read out to the vertical signal line 30*f* as indicated by an arrow 75. Through this process, the vertical drive unit 50 simultaneously reads out the pixel signals from the pixel 10 (1, 1) in the second row, the pixel 10 (4, 1) in the fifth row and the pixel 10 (7, 1) in the eighth row, among the selection pixels within the second column, to vertical signal lines 30 different from one another. In addition, the vertical drive unit 50 simultaneously reads out the pixel signals from the pixel 10 (1, 4) in the second row, the pixel 10 (4, 4) in the fifth row and the pixel 10 (7, 4) in the eighth row, among the selection pixels within the fifth column, to vertical signal lines 30 different from one another.

Once the pixel signals are read out from selection pixels located in the same column of the second, fifth and eighth rows, the vertical drive unit 50 simultaneously reads out pixel signals from selection pixels in the same column of the 11th row, the 14th row and the 17th row. Subsequently, selection pixels present within the common columns and located at three rows, are sequentially selected and pixel signals are read out in the same way from the selection pixels at the image sensor 3.

In the third control mode described above, the vertical drive unit 50 selects selection pixels by culling pixels in specific rows and columns, among all the pixels, simultaneously reads out pixel signals from a plurality of selection pixels (three selection pixels in the present embodiment) within the common columns and then simultaneously reads out pixel signals from the plurality of selection pixels selected next. The pixel signals sequentially read out in units of a plurality of selection pixels undergo signal processing via the column circuits 40 and the like and are then output to the control unit 4. The control unit 4 generates image data (e.g., video image data) by using the pixel signals from the selection pixels, output from the image sensor 3.

As described above, the image sensor 3 reads out pixel signals from pixels 10 in a plurality of rows to vertical signal lines 30 different from one another by controlling the switches SW1, the switch SW2a, the switch SW2b, the switch SW3a and the switch SW3b. Thus, the image sensor 3 is able to simultaneously read out the pixel signals from a plurality of groups of pixels 10 each belonging in the same column. This enables the image sensor 3 to simultaneously read out pixel signals over a shorter period of time in comparison to the length of time required to sequentially read out pixel signals from the various pixels 10 within the same column to a single vertical signal line. As a result, the frame rate for video shooting operation can be improved. The image sensor 3 in the present embodiment is able to read out pixel signals from the individual pixels 10 over a length of time that is approximately one third of the length of time required when sequentially reading out pixel signals from the individual pixels 10 located within a single column to a single vertical signal line, namely, a triple frame rate can be achieved.

Figure 3:
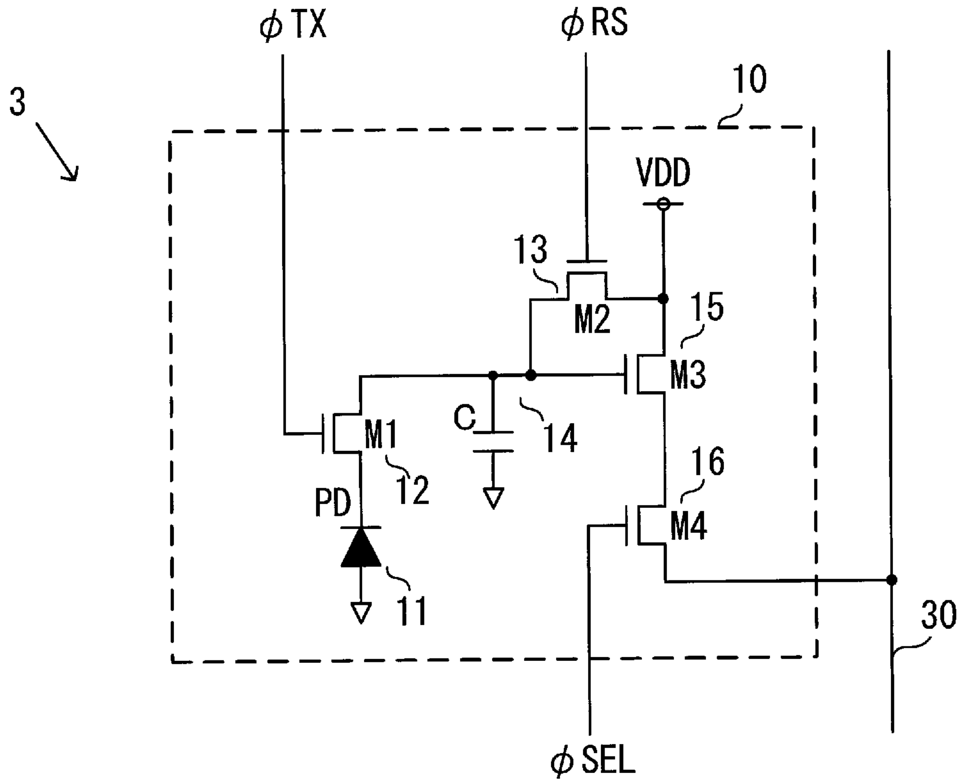

In reference to FIGS. 3 through 6, the circuit structure adopted in the image sensor 3 according to the first embodiment, together with operations executed therein, will be described in further detail. FIG. 3 is a circuit diagram illustrating the pixel structure adopted in the image sensor 3 according to the first embodiment. A pixel 10 includes a photoelectric conversion unit 11, a transfer unit 12, a reset unit 13, a floating diffusion (FD) 14, an amplifier unit 15 and a selection unit 16. The photoelectric conversion unit 11, constituted with a photodiode PD, has a function of converting light having entered therein to an electric charge and accumulating the electric charge resulting from the photoelectric conversion.

The transfer unit 12, which is constituted with a transistor M1 controlled with the drive signal øTX, transfers the electric charge resulting from photoelectric conversion at the photoelectric conversion unit 11 to the FD 14. Namely, the transfer unit 12 forms an electric charge transfer path between the photoelectric conversion unit 11 and the FD 14. The transistor M1 is a transfer transistor. The electric charge transferred to the FD 14 is accumulated (held) in a capacitor C at the FD 14. The FD 14 also functions as an accumulating unit 14 that accumulates an electric charge.

The amplifier unit 15 amplifies a signal generated based upon the electric charge accumulated in the capacitor C at the FD 14, and outputs the amplified signal. The amplifier unit 15 is constituted with a transistor M3, a drain (terminal), a gate (terminal) and a source (terminal) of which are respectively connected to a source VDD, the FD 14 and the selection unit 16. The source of the amplifier unit 15 is connected to a vertical signal line 30 via the selection unit 16. The amplifier unit 15 functions as part of a source follower circuit with an electric current source (not shown) acting as a load current source. The transistor M3 is an amplifier transistor.

The reset unit 13, which is constituted with a transistor M2 controlled with the drive signal øRS, resets the electric charge at the capacitor C and resets the voltage at the FD 14. The transistor M2 is a reset transistor. The selection unit 16, constituted with a transistor M4 controlled with the drive signal øSEL, is a connection unit 16 that connects/disconnects the amplifier unit 15 with/from the vertical signal line 30. When the transistor M4 constituting the selection unit 16 is in an ON state, the signal from the amplifier unit 15 is output to the vertical signal line 30. The transistor M4 is a selection transistor, and constitutes the switch SW1 explained in reference to FIG. 2.

Figure 4:
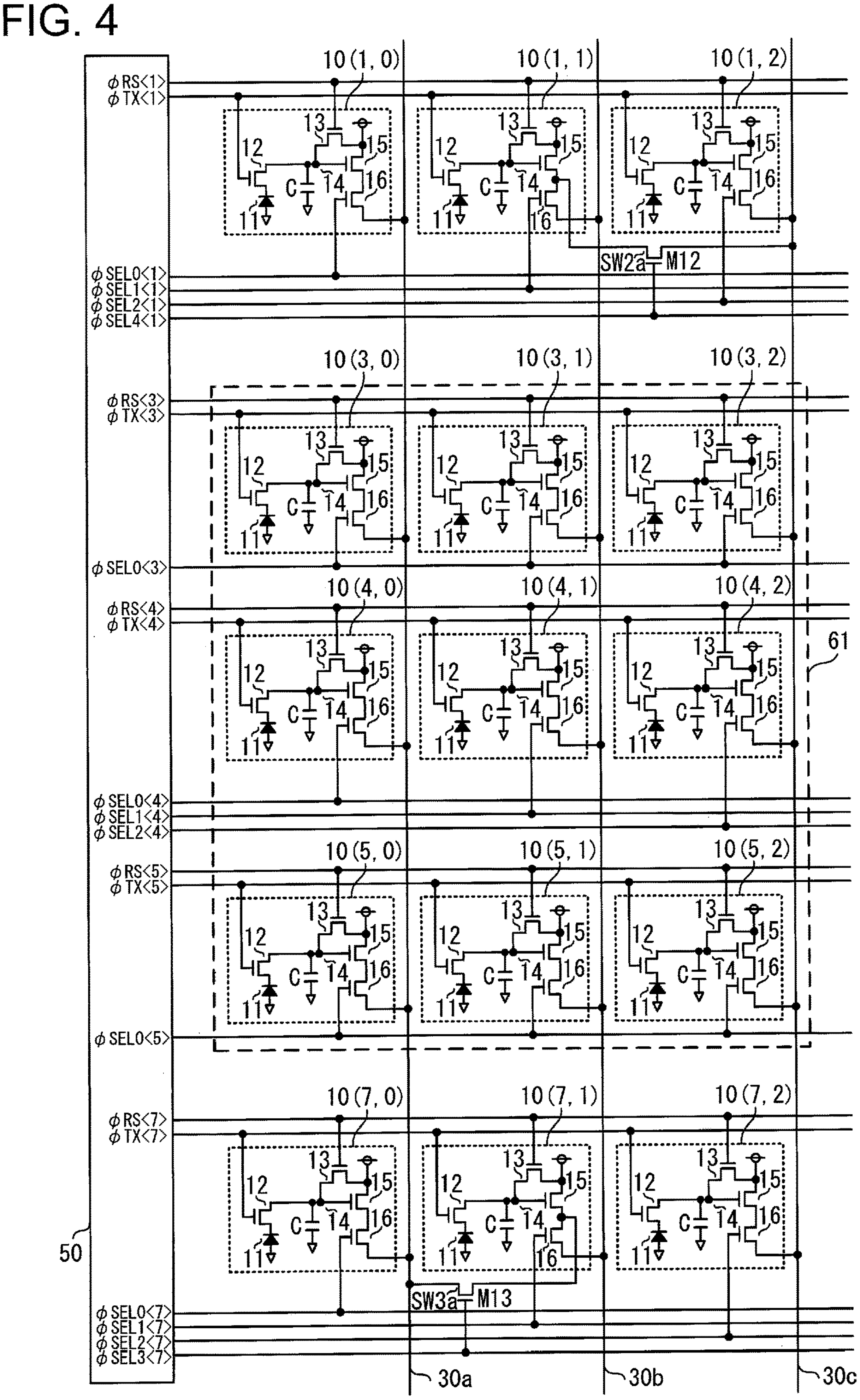
Figure 5:
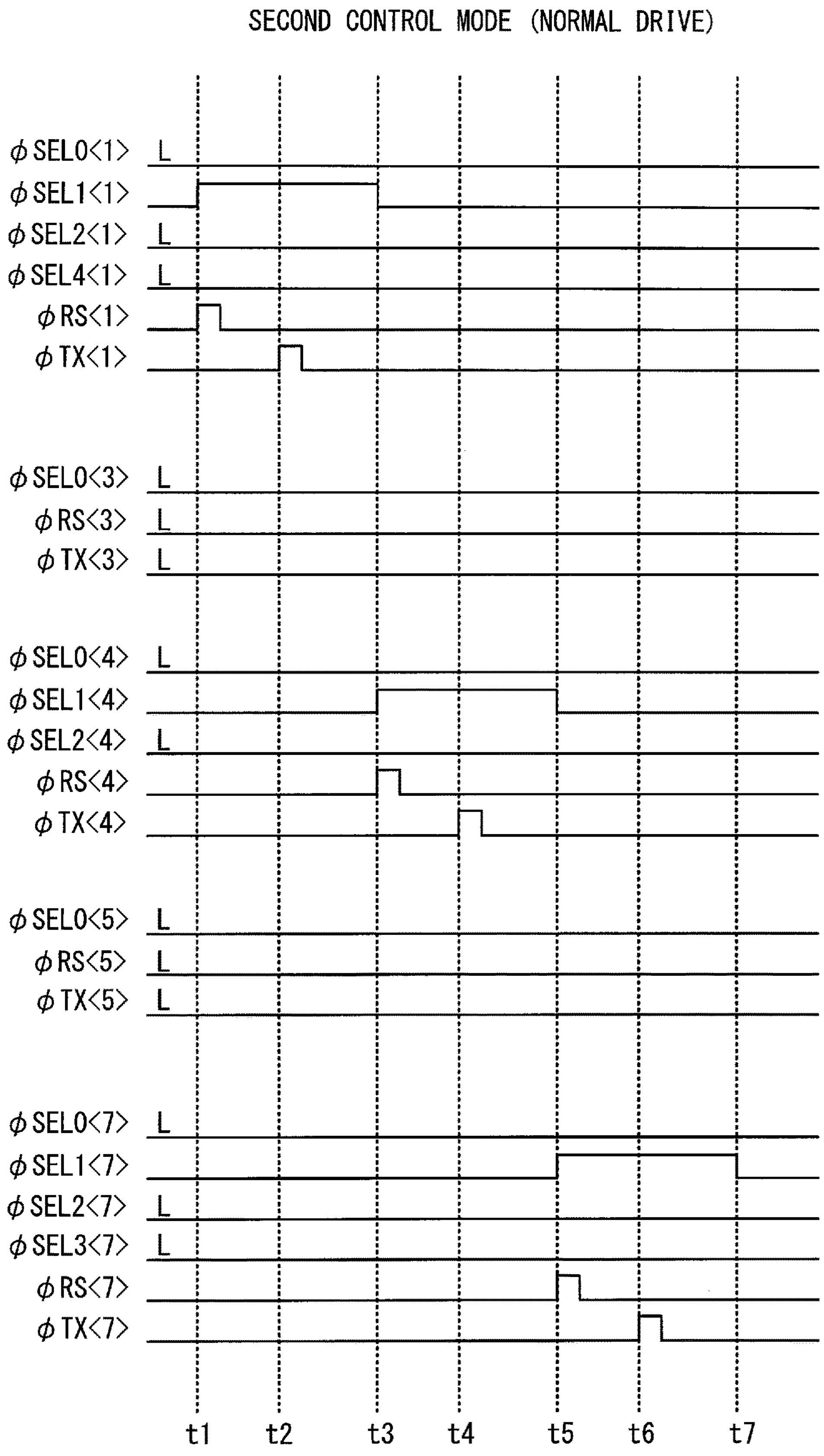
Figure 6:
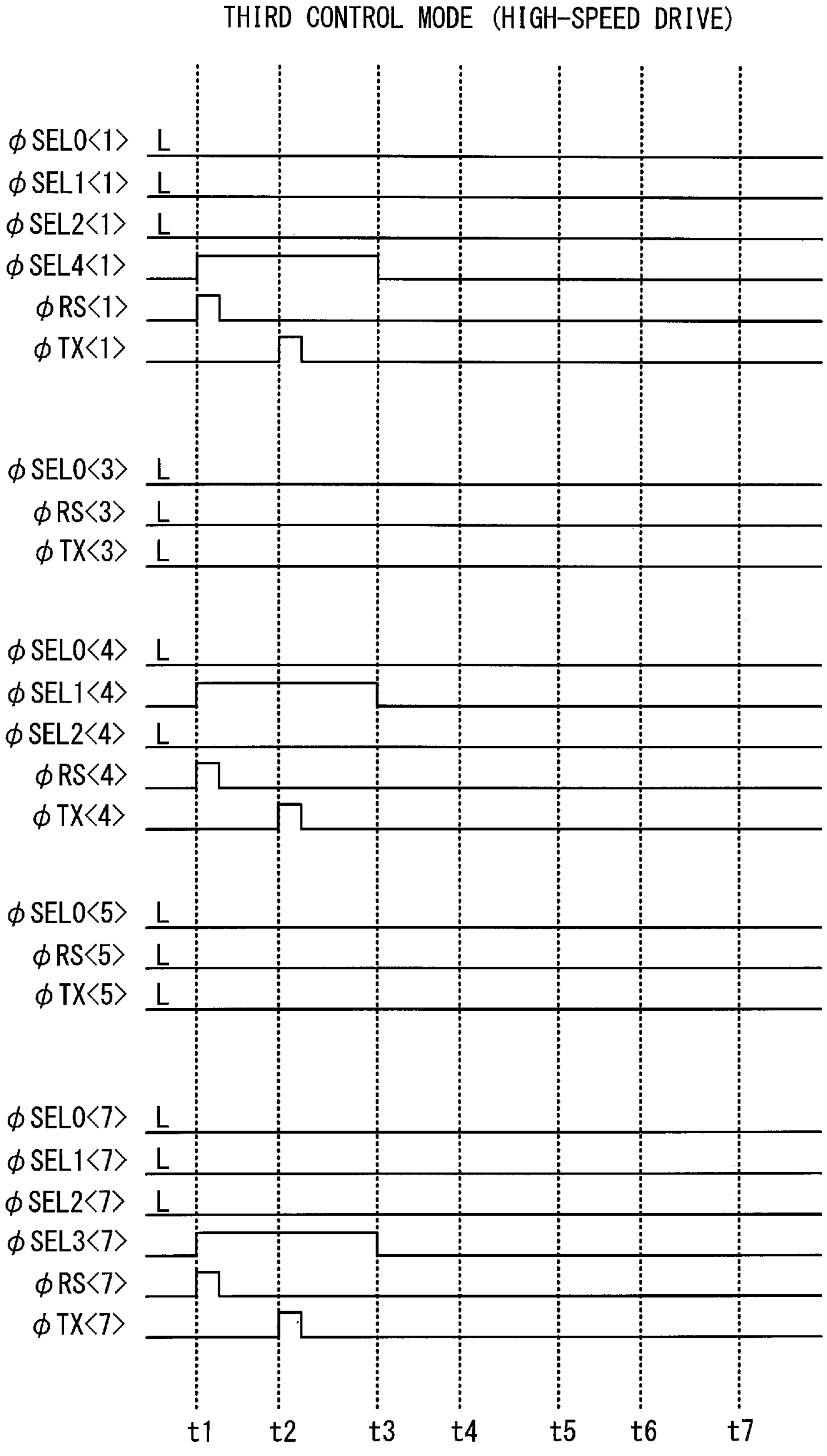

FIG. 4 is a circuit diagram showing the circuit structure adopted in the image sensor 3 according to the first embodiment in further detail. FIG. 5 is a timing chart illustrating an example of an operation executed in the image sensor 3 in the second control mode. FIG. 6 is a timing chart illustrating an example of an operation executed in the image sensor 3 in the third control mode.

As shown in FIG. 4, the image sensor 3 includes a plurality of pixels 10 arranged in a matrix pattern, a plurality of vertical signal lines 30 and a vertical drive unit 50. It is to be noted that only the pixels 10 in the pixel block 60, the pixel block 61 and the pixel block 62 in FIG. 2 are shown in FIG. 4 so as to simplify the illustration. The pixel block 60 and the pixel block 62 are each represented in the figure by the three pixels in the central row among the three×three pixels. Namely, the pixel 10 (1, 0) through the pixel 10 (1, 2) represent the pixel block 60 and the pixel 10 (7, 0) through the pixel 10 (7, 2) represent the pixel block 62 in the figure. All the three×three=nine pixels are shown for the pixel block 61 in the figure.

FIG. 4 shows a transistor M12 constituting the switch SW2a in FIG. 2 and a transistor M13a constituting the switch SW3a in FIG. 2. The switch SW2a connects a region between the amplifier unit 15 and the selection unit 16 at the pixel 10 (1, 1) with the vertical signal line 30c. The switch SW3a connects a region between the amplifier unit and the selection unit 16 at the pixel 10 (7, 1) with the vertical signal line 30a. The transistor M12 constituting the switch SW2a and the transistor M13 constituting the switch SW3a are respectively controlled with the drive signal øSEL4 <1> and the drive signal øSEL3 <7>. The vertical drive unit 50 provides the drive signal øRS, the drive signal øTX and the drive signals øSEL0 through øSEL4 to the pixels 10 and the switches SW2a and SW3a in order to control the pixels 10 and the switches SW2a and SW3a.

The timing chart in FIG. 5, with time points indicated along the horizontal axis, shows control signals input to the various portions of the image sensor 3 in FIG. 4 in the second control mode. In addition, in FIG. 5, when a control signal is at high level (e.g., the source potential), the transistor or the switch to which the control signal is input enters an ON state and when a control signal is at low level (e.g., the ground potential), the transistor or the switch to which the control signal is input enters an OFF state.

At a time point t1 in FIG. 5, the drive signal øRS <1> is set to high level and as a result, the transistor M2 constituting the reset unit 13 enters an ON state at the pixel 10 (1, 1) which is a selection pixel in the second row. Thus, the electric charge at the capacitor C in the FD 14 is reset and the potential at the FD 14 is adjusted to a reset potential at the pixel 10 (1, 1). In addition, at the time point t1, as the drive signal øSEL1 <1> shifts to high level, a signal generated based upon the reset potential at the pixel 10 (1, 1) is output the vertical signal line 30b via the amplifier unit 15 and the selection unit 16. Namely, a signal (reset signal)

generated after resetting the electric charge in the FD 14 of the pixel (1, 1) is read out to the vertical signal line 30*b*. The reset signal from the pixel 10 (1, 1) in the second row having been output the vertical signal line 30*b* is input to the column circuit unit 40*b* where it is converted to a digital signal.

At a time point t2, as the drive signal øTX <1> shifts to high level, the transistor M1 constituting the transfer unit 12 enters an ON state and the electric charge resulting from photoelectric conversion in the photoelectric unit 11 is transferred to the FD 14 in the pixel 10 (1, 1). In addition, at the time point t2, the drive signal øSEL1 <1> is at high level, and thus, a pixel signal generated based upon the electric charge generated in the photoelectric unit 11 at the pixel 10 (1, 1) is output to the vertical signal line 30*b* via the amplifier unit 15 and the selection unit 16. The pixel signal from the pixel 10 (1, 1) in the second row, having been output to the vertical signal line 30*b*, is input to the column circuit unit 40*b* where it is converted to a digital signal. The reset signal and the pixel signal having been converted to digital signals are input a signal processing unit (not shown). The signal processing unit executes signal processing such as correlated double sampling through which the reset signal and the pixel signal undergo differential processing. The signal processing unit outputs the pixel signal having undergone the processing to the control unit 4.

In a time period elapsing between a time point t3 and a time point t5, a reset signal is read out and a pixel signal is read out from the pixel 10 (4, 1) designated as a selection pixel in the fifth row, in the same way as the signal readout executed during the time period elapsing between the time point t1 and the time point t3. In a time period elapsing between the time point t5 and a time point t7, a reset signal is read out and a pixel signal is read out from the pixel 10 (7, 1) designated as a selection pixel in the eighth row, in the same way as the signal readout executed during the time period elapsing between the time point t1 and the time point t3. In the second control mode in FIG. 5, pixel signals can be read out by selecting, in sequence, selection pixels in in units of single row.

The timing chart in FIG. 6, with time points indicated along the horizontal axis, shows control signals input to the various elements of the image sensor 3 in FIG. 4 in the third control mode. At a time point t1 in FIG. 6, the drive signal øRS <1>, the drive signal øRS <4> and the drive signal øRS <7> are set to high level. With the drive signal øRS <1> shifting to high level, the transistor M2 constituting the reset unit 13 enters an ON state, thereby resetting the electric charge at the FD 14 in the pixel 10 (1, 1) designated as a selection pixel in the second row. In addition, with the drive signal øRS <4> shifting to high level, the transistor M2 constituting the reset unit 13 enters an ON state, thereby resetting the electric charge at the FD 14 in the pixel 10 (4, 1) designated as a selection pixel in the fifth row. Likewise with the drive signal øRS <7> shifting to high level, the transistor M2 constituting the reset unit 13 enters an ON state, thereby resetting the electric charge at the FD 14 in the pixel 10 (7, 1) designated as a selection pixel in the eighth row.

In addition, at the time point t1, the drive signal øSEL4 <1>, the drive signal øSEL1 <4> and the drive signal øSEL3 <7> are set to high level. With the drive signal øSEL4 <1> shifting to high level, the switch SW2*a* enters an ON state. As a result, a reset signal from the pixel 10 (1, 1) is output to the vertical signal line 30*c* via the amplifier unit of the pixel 10 (1, 1) and the switch SW2*a*. Furthermore, as the drive signal øSEL1 <4> shifts to high level, a reset signal from the pixel 10 (4, 1) is output to the vertical signal line 30*b* via the amplifier unit 15 and the selection unit 16 of the pixel 10 (4, 1). Also, as the drive signal øSEL3 <7> shifts to high level, the switch SW3*a* enters an ON state. As a result, a reset signal from the pixel 10 (7, 1) is output to the vertical signal line 30*a* via the amplifier unit 15 of the pixel 10 (7, 1) and the switch SW3*a*. Through this process, the reset signals from the pixel 10 (7, 1), the pixel 10 (4, 1) and the pixel 10 (1, 1) are simultaneously read out to the vertical signal lines 30*a* through 30*c*. The reset signals individually output to the vertical signal lines 30*a* through 30*c* are then respectively input to the column circuit units 40*a* through 40*c* where they are converted to digital signals.

At the time point t2, the drive signal øTX <1>, the drive signal øTX <4> and the drive signal øTX <7> are set to high level. As a result, the transistor M1 constituting the transfer unit 12 enters an ON state and an electric charge resulting from photoelectric conversion at the photoelectric conversion unit 11 is transferred to the FD 14 at each of the pixel 10 (1, 1), the pixel 10 (4, 1) and the pixel 10 (7, 1). In addition, at the time point t2, the drive signal øSEL4 <1> is at high level, and thus, a pixel signal from the pixel 10 (1, 1) is output to the vertical signal line 30*c* via the switch SW2*a*. Furthermore, since the drive signal øSEL1 <4> is at high level, a pixel signal from the pixel 10 (4, 1) is output to the vertical signal line 30*b* via the selection unit 16 of the pixel 10 (4, 1). Moreover, since the drive signal øSEL3 <7> is at high level, a pixel signal from the pixel 10 (7, 1) is output to the vertical signal line 30*a* via the switch SW3*a*.

Through the process described above, the pixel signals from the pixel 10 (7, 1), the pixel 10 (4, 1) and the pixel 10 (1, 1) are simultaneously read out to the vertical signal lines 30*a* through 30*c*. The pixel signals individually output to the vertical signal lines 30*a* through 30*c* are respectively input to the column circuit units 40*a* through 40*c* where they are converted to digital signals. The reset signals and the pixel signals having been converted to digital signals, are input to the signal processing unit. The signal processing unit first executes signal processing such as correlated double sampling and then outputs the pixel signals, having undergone the processing, to the control unit 4.

During a time period that includes and follows a time point t3, selection pixels are selected in sequence in units of three rows and reset signals and pixel signals are read out in the same way as in the signal readout executed over the time period elapsing between the time point t1 and the time point t3. In the third control mode executed as described above in reference to FIG. 6, pixel signals can be read out simultaneously in units of a plurality of rows by selecting, in sequence, selection pixels in units of three rows.

Next, properly use of the first control mode, the second control mode and the third control mode will be explained. The control unit 4 controls the image sensor 3 in the first control mode when the camera 1 is engaged in a high-resolution still image photographing operation. In addition, the control unit 4 controls the image sensor 3 in the second control mode or in the third control mode when the camera 1 is engaged in a video shooting operation or when a live-view image of the subject is displayed at the display unit 6 of the camera 1.

Furthermore, when the camera 1 is engaged in a photographing operation at a high frame rate, as in a high-speed continuous shooting operation or a high-speed video shooting operation, the control unit 4 controls the image sensor 3 in the third control mode so as to read out pixel signals at high speed. In addition, the camera 1 may include a subject velocity detection unit and a subject velocity equal to or greater than a predetermined value may be detected by the subject velocity detection unit. Under such circumstances, the control unit 4 will control the image sensor 3 in the third control mode so as to minimize the extent of image blur by reading out pixel signals at high speed. It is to be noted that the subject velocity detection unit may detect a subject velocity based upon the extent of subject image displacement occurring in two images, one preceding the other, which constitute the live-view image.

The following advantageous effects are achieved through the embodiment described above.

(1) The image sensor 3 comprises a plurality of pixels 10 each having a photoelectric conversion unit 11 that generates an electric charge through photoelectric conversion of incident light, arranged along both of a first direction (column direction) and a second direction (row direction) different from the first direction, signal lines (vertical signal lines 30) each disposed in correspondence to a plurality of pixels 10 disposed along the first direction and a control unit (vertical drive unit 50) that executes control so as to output signals, each generated based upon the electric charge generated in the photoelectric conversion unit 11, to signal lines different from one another from the plurality of pixels disposed along the first direction. By adopting this structure, the length of time required for pixel signal readout can be reduced. This, in turn, makes it possible to improve the frame rate for a video shooting operation.

(2) The plurality of pixels 10 include a first pixel (e.g., the pixel 10 (4, 1)) and a second pixel (e.g., the pixel 10 (1, 1)) disposed along the first direction. The plurality of signal lines include a first signal line (vertical signal line 30*b*) connected to the first pixel and the second pixel and a second signal line (vertical signal line 30*c*) different from the first signal line. The image sensor 3 further includes a second connection unit (switch SW2*a*) that connects/disconnects the second pixel with/from the second signal line. The control unit 50 executes control so as to output a signal from the first pixel to the first signal line and output a signal from the second pixel to the second signal line by setting the second connection unit in a connected state. As a result, pixel signals from a plurality of pixels (e.g., the pixel 10 (1, 1) and the pixel 10 (4, 1)) located within a single column can be simultaneously read out.

(3) The plurality of pixels 10 includes a first pixel and a second pixel (e.g., the pixel (4, 1) and the pixel 10 (1, 1)) disposed in a first column and a third pixel and a fourth pixel (e.g., the pixel 10 (4, 2) and the pixel 10 (1, 2)) disposed in a second column. The plurality of signal lines include a first signal line (vertical signal line 30*b*) connected to the first pixel and the second pixel and a second signal line (vertical signal line 30*c*) connected to the third pixel and the fourth pixel. The image sensor 3 further includes a second connection unit (switch SW2*a*) that connects/disconnects the second pixel with/from the second signal line. The control unit 50 stops signal output from the third and fourth pixels to the second signal line, sets the second connection unit in a connected state, allows a signal from the first pixel to be output to the first signal line and allows a signal from the second pixel to be output to the second signal line. Through these measures, pixel signals from a plurality of pixels (e.g., the pixel 10 (1, 1) and the pixel 10 (4, 1)) located within the same column can be simultaneously read out to vertical signal lines different from each other.

Second Embodiment

Figure 7:
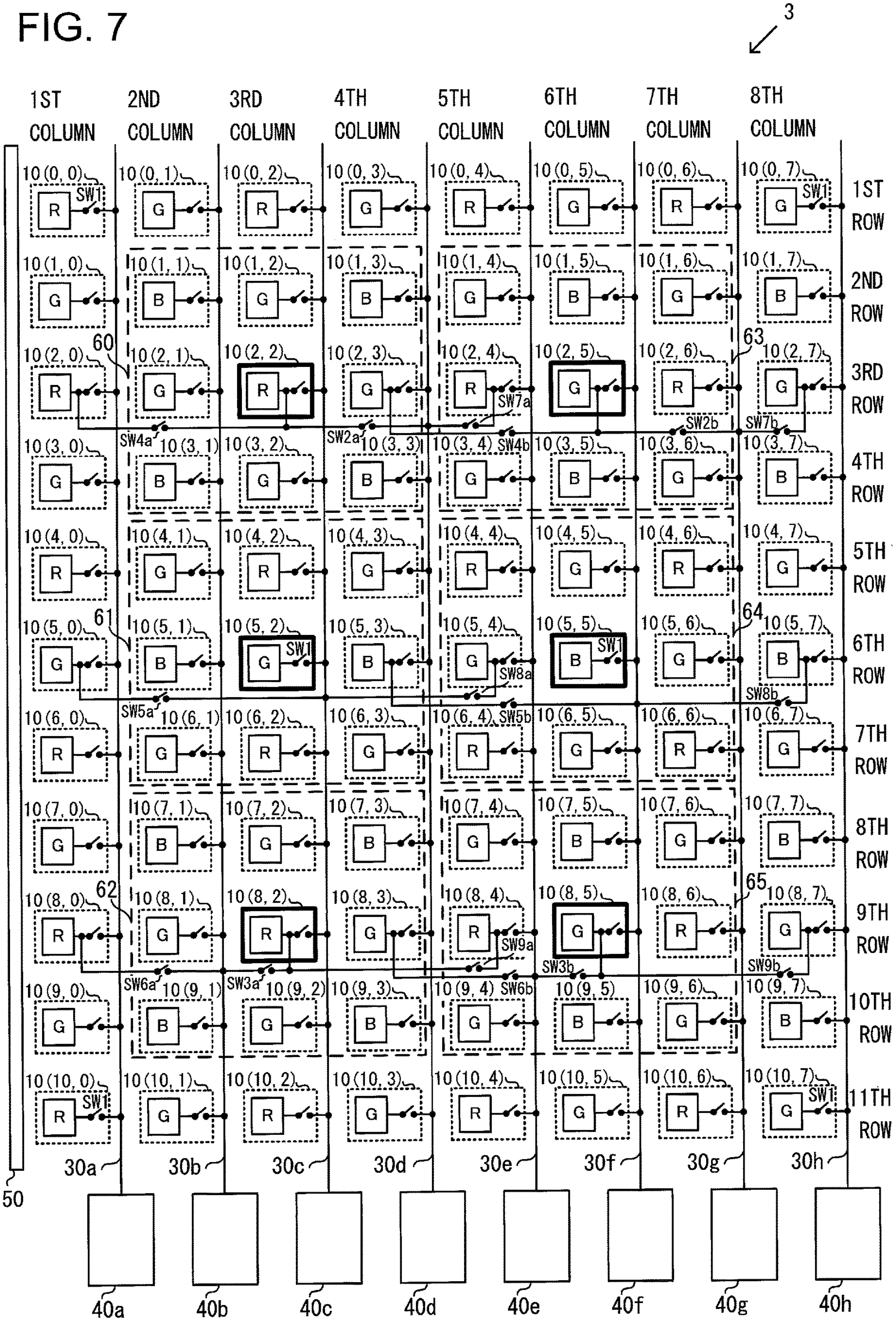

In reference to drawings, the image-capturing device according to the second embodiment will be described. The image-capturing device according to the second embodiment executes processing through which a signal generated by combining signals from a plurality of pixels 10 is read out when the third control mode is selected. In reference to FIG. 7, the signal readout method adopted in the image sensor 3 according to the second embodiment will be explained. FIG. 7 is a block diagram illustrating part of the structure adopted in the image sensor 3 according to the second embodiment. It is to be noted that the example shown in FIG. 7 only shows eight pixels in row direction×eleven pixels in column direction as pixels 10 so as to simplify the illustration. In addition, the figure shows 88 pixels 10 including the pixel 10 located at the upper left corner, which is designated as a first row/first column pixel 10 (0, 0), and the pixel 10 located at the lower right corner designated as an eleventh row/eighth column pixel 10 (10, 7). The 88 pixels disposed over the eight pixels in row direction×eleven pixels in column direction shown in FIG. 7, too, represent a pixel group that may be disposed in any area of the image-capturing surface of the image sensor 3, as do the pixels 10 in FIG. 2.

In the present embodiment, a signal from a selection pixel is combined with signals from a plurality of pixels corresponding to the same color as that of the selection pixel, which are disposed around the selection pixel. As a result, a pixel signal generated by combining the signal from the selection pixel with signals from pixels, that would be culled in the first embodiment, can be obtained in the present embodiment. The control unit 4 of the camera 1 generates image data based upon combined pixel signal. Through these measures, the occurrence of noise, such as moire fringe, in an image can be prevented. The following is a detailed explanation.

The pixels, each enclosed in a bold-line frame in FIG. 7, i.e., the pixel 10 (2, 2), the pixel 10 (5, 2), the pixel 10 (8, 2), the pixel 10 (2, 5), the pixel 10 (5, 5) and the pixel 10 (8, 5), are selection pixels, as in the first embodiment. These selection pixels are each the pixel located at the central position in one of pixel blocks 60 through 65 each made up with three×three=nine pixels. This means that selection pixels are selected at a rate of one in nine pixels.

With respect to the pixel block 60, the signal from the R pixel 10 (2, 2) designated as the selection pixel is combined with signals from eight R pixels 10 disposed around the R pixel 10 (2, 2). Namely, the vertical drive unit 50 reads out a signal generated by combining the signals from the nine R pixels 10 as a pixel signal corresponding to the selection pixel 10 (2, 2). To describe this in further detail, the signals from the nine pixels, i.e., the R pixel 10 (0, 0), the R pixel 10 (0, 2), the R pixel 10 (0, 4), the R pixel 10 (2, 0), the R pixel 10 (2, 2), the R pixel 10 (2, 4), the R pixel 10 (4, 0), the R pixel 10 (4, 2) and the R pixel 10 (4, 4) are combined. The signal generated by combining the signals from these nine pixels is read out to the vertical signal line 30*d* as the pixel signal corresponding to the selection pixel 10 (2, 2).

With respect to the pixel block 61, the signal from the G pixel 10 (5, 2) designated as the selection pixel is combined with signals from the eight G pixels 10 disposed around the G pixel 10 (5, 2). Namely, the vertical drive unit 50 reads out a signal generated by combining the signals from the nine G pixels 10 as a pixel signal corresponding to the selection pixel 10 (5, 2). To describe this in further detail, the signals from the nine pixels, i.e., the G pixel 10 (3, 0), the G pixel 10 (3, 2), the G pixel 10 (3, 4), the G pixel 10 (5, 0), the G pixel 10 (5, 2), the G pixel 10 (5, 4), the G pixel 10 (7, 0), the G pixel 10 (7, 2) and the G pixel 10 (7, 4) are combined. The signal generated by combining the signals from these nine pixels is read out to a vertical signal line 30*c* as the pixel signal corresponding to the selection pixel 10 (5, 2).

It is to be noted that the G pixel 10 (4, 1), the G pixel 10 (4, 3), the G pixel 10 (6, 1) and the G pixel 10 (6, 3) are present around the G pixel 10 (5, 2) designated as the selection pixel, at positions closer to the G pixel 10 (5, 2) than the eight same-color pixels listed above. Accordingly, a signal generated by combining the signals from a total of 13 pixels including signals from the four pixels, i.e., the G pixel 10 (4, 1), the G pixel 10 (4, 3), the G pixel 10 (6, 1) and the G pixel 10 (6, 3) as well as signals the nine G pixels listed above, may be read out as a pixel signal corresponding to the selection pixel 10 (5, 2).

With respect to the pixel block 62, the signal from the R pixel 10 (8, 2) designated as the selection pixel for the pixel block is combined with signals from eight R pixels 10 disposed around the R pixel 10 (8, 2) as in the case of the pixel block 60. A signal generated by combining the signals from these nine pixels is read out to the vertical signal line 30*b* as a pixel signal corresponding to the selection pixel 10 (8, 2).

With respect to the pixel block 63, the signal from the G pixel 10 (2, 5) designated as the selection pixel for the pixel block is combined with signals from eight G pixels 10 disposed around the G pixel 10 (2, 5) as in the case of the pixel block 61. A signal generated by combining the signals from these nine pixels is read out to the vertical signal line 30*g* as the pixel signal corresponding to the selection pixel 10 (2, 5). It is to be noted that a signal generated by combining signals from a total of 13 pixels, including four pixels, i.e., the G pixel 10 (1, 4), the G pixel 10 (1, 6), the G pixel 10 (3, 4) and the G pixel (3, 6) as well as the nine G pixels listed above, may instead be read out as a pixel signal corresponding to the selection pixel 10 (2, 5) in the pixel block 63, as in the case of the pixel block 61.

With respect to the pixel block 64, the signal from the B pixel 10 (5, 5) designated as the selection pixel for the pixel block is combined with signals from eight B pixels 10 disposed around the B pixel 10 (5, 5). Namely, the vertical drive unit 50 reads out a signal generated by combining the signals from the nine B pixels 10 as a pixel signal corresponding to the selection pixel 10 (5, 5). To describe this in further detail, the signals from the nine pixels, i.e., the B pixel 10 (3, 3), the B pixel 10 (3, 5), the B pixel 10 (3, 7), the B pixel 10 (5, 3), the B pixel 10 (5, 5), the B pixel 10 (5, 7), the B pixel 10 (7, 3), the B pixel 10 (7, 5) and the R pixel 10 (7, 7) are combined. The signal generated by combining the signals from these nine pixels is read out to the vertical signal line 30*f* as the pixel signal corresponding to the selection pixel 10 (5, 5).

With respect to the pixel block 65, the signal from the G pixel 10 (8, 5) designated as the selection pixel for the pixel block is combined with signals from the eight G pixels disposed around the G pixel 10 (8, 5) as in the case of the pixel blocks 61 and 63. A signal generated by combining signals from these nine pixels is read out to a vertical signal line 30*e* as a pixel signal corresponding to the selection pixel 10 (8, 5). It is to be noted that a signal generated by combining the signals from a total of 13 pixels including four pixels, i.e., the G pixel 10 (7, 4), the G pixel 10 (7, 6), the G pixel 10 (9, 4) and the G pixel 10 (9, 6) as well as the nine G pixels listed above, may instead be read out as a pixel signal corresponding to the selection pixel 10 (8, 5) in the pixel block 65, as in the case of the pixel blocks 61 and 63.

Next, the circuit structure that allows a signal from the selection pixel in each pixel block among the pixel blocks 60 through 65 to be combined with signals from same-color pixels disposed around the selection pixel and the signal combination processing executed to combine the signals will be explained in further detail. The vertical drive unit 50 sets switches SW2*a* through SW9*a* and switches SW2*b* through SW9*b* shown in FIG. 7 in an ON state. In addition, the vertical drive unit 50 sets the switches SW1 in an ON state in the pixel 10 (5, 2) and the pixel 10 (5, 5) and sets the switches SW1 in an OFF state in the other pixels.

In addition, as will be explained in detail later, the FDs 14 (see FIG. 3) at the R pixel 10 (0, 0), the R pixel 10 (2, 0) and the R pixel 10 (4, 0) in the same column (first column) are connected with one another via connection units (connection units 20 in FIG. 8). As a result, signals (electric charges) at the FDs 14 in the R pixel 10 (0, 0), the R pixel (2, 0) and the R pixel 10 (4, 0) are averaged. Likewise, the FDs 14 at the R pixel 10 (0, 2), the R pixel 10 (2, 2) and the R pixel 10 (4, 2) in the same column (third column) are connected with one another and signals at the FDs 14 in the R pixel 10 (0, 2), the R pixel (2, 2) and the R pixel 10 (4, 2) are averaged. In addition, the FDs 14 at the R pixel 10 (0, 4), the R pixel 10 (2, 4) and the R pixel 10 (4, 4) in the same column (fifth column) are connected with one another and signals at the FDs 14 in the R pixel 10 (0, 4), the R pixel (2, 4) and the R pixel 10 (4, 4) are averaged.

With the switch SW4*a*, the switch SW2*a* and the switch SW7*a* set in an ON state, the R pixel 10 (2, 2), designated as the selection pixel in the pixel block 60, and the R pixel 10 (2, 0) and the R pixel 10 (2, 4) disposed in the same row (the third row) at the R pixels 10 (2, 2) are connected to the vertical signal line 30*d*. In more specific terms, the R pixel 10 (2, 0), the R pixel 10 (2, 2) and the R pixel 10 (2, 4) are all connected to the vertical signal line 30*d* respectively via the switches SW4*a* and SW2*a*, via the switch SW2*a* and via the switch SW7*a*.

With the R pixel 10 (2, 0), the R pixel 10 (2, 2) and the R pixel 10 (2, 4) connected to the vertical signal line 30*d*, the signals from the individual pixels 10 (2, 0), 10 (2, 2) and (2, 4) are combined. Namely, a signal representing the average of the signals from the R pixels 10 (0, 0), 10 (2, 0) and 10 (4, 0), a signal representing the average of the signals from the R pixels 10 (0, 2), 10 (2, 2) and 10 (4, 2) and a signal representing the average of the signals from the R pixels 10 (0, 4), 10 (2, 4) and 10 (4, 4) are combined. As a result, a signal generated by combining the signals from these nine R pixels 10 is output to the vertical signal line 30*d* as a pixel signal generated in correspondence to the selection pixel (2, 2).

In addition, the FDs 14 at the G pixel 10 (3, 0), the G pixel 10 (5, 0) and the G pixel 10 (7, 0) in the same column (first column) are connected with one another and signals at the FDs 14 in these pixels are averaged. Likewise, the FDs 14 at the G pixel 10 (3, 2), the G pixel 10 (5, 2) and the G pixel 10 (7, 2) in the same column (third column) are connected with one another and signals at the FDs 14 in these pixels are averaged. In addition, the FDs 14 at the G pixel 10 (3, 4), the G pixel 10 (5, 4) and the G pixel 10 (7, 4) in the same column (fifth column) are connected with one another and signals at the FDs in these pixels are averaged.

With the switch SW5*a*, the switch SW8*a* and the switch SW1 at the pixel 10 (5, 2) set in an ON state, the G pixel 10 (5, 2), designated as the selection pixel in the pixel block 61, and the G pixel 10 (5, 0) and the G pixel 10 (5, 4) disposed in the same row (the sixth row) as the G pixel 10 (5, 2) are connected to the vertical signal line 30*c*. In more specific terms, the G pixel 10 (5, 0) and the G pixel 10 (5, 2), the G pixel 10 (5, 4) are all connected to the vertical signal line 30*c* respectively via the switch SW5*a*, via the switch SW1 and via the switch SW8*a*. Thus, a signal generated by combining the signals from the pixel 10 (3, 0), the pixel 10 (3, 2), the pixel 10 (3, 4), the pixel 10 (5, 0), the pixel 10 (5, 2), the pixel 10 (5, 4), the pixel 10 (7, 0), the pixel 10 (7, 2) and the pixel 10 (7, 4) is output to the vertical signal line 30*c* as a pixel signal generated in correspondence to the selection pixel 10 (5, 2).

In addition, the FDAs 14 at the R pixel 10 (6, 0), the R pixel 10 (8, 0) and the R pixel 10 (10, 0) in the same column (first column) are connected with one another and signals at the FDs 14 in these pixels are averaged. Likewise, the FDs 14 at the R pixel 10 (6, 2), the R pixel 10 (8, 2) and the R pixel 10 (10, 2) in the same column (third column) are connected with one another and signals at the FDs 14 in these pixels are averaged. In addition, the FDs 14 at the R pixel 10 (6, 4), the R pixel 10 (8, 4) and the G pixel 10 (10, 4) in the same column (fifth column) are connected with one another and signals at the FDs in these pixels are averaged.

With the switch SW6*a*, the switch SW3*a* and the switch SW9*a* set in an ON state, the R pixel 10 (8, 2), designated as the selection pixel in the pixel block 62, and the R pixel 10 (8, 0) and the R pixel 10 (8, 4) disposed in the same row (the ninth row) as the R pixel 10 (8, 2) are connected to the vertical signal line 30*b*. In more specific terms, the R pixel 10 (8, 0) and the R pixel 10 (8, 2), the R pixel 10 (8, 4) are all connected to the vertical signal line 30*b* respectively via the switch SW6*a*, via the switch SW3*a* and via the switch SW9*a* and the switch SW3*a*. Thus, a signal generated by combining the signals from the pixel 10 (6, 0), the pixel 10 (6, 2), the pixel 10 (6, 4), the pixel 10 (8, 0), the pixel (8, 2), the pixel 10 (8, 4), the pixel 10 (10, 0), the pixel 10 (10, 2) and the pixel 10 (10, 4) is output to the vertical signal line 30*b* as a pixel signal generated in correspondence to the selection pixel 10 (8, 2).

The G pixel 10 (2, 5), designated as the selection pixel in the pixel block 63, and the G pixels 10 (2, 3) and 10 (2, 7) located in the same row as the G pixel 10 (2, 5) are all connected to the vertical signal line 30*g* via the switch SW2*b*, the switch SW4*b* and the switch SW7*b*, in the same way as those described in reference to the pixel blocks 60 through 62. In addition, the FDs 14 at the G pixels 10 (0, 3), 10 (2, 3) and 10 (4, 3) in the fourth column are connected with one another. Likewise, the FDs 14 at the G pixels 10 (0, 5), 10 (2, 5) and 10 (4, 5) in the sixth column are connected with one another and the FDs 14 at the G pixels 10 (0, 7), 10 (2, 7) and 10 (4, 7) in the eighth column are connected with one another. Thus, a signal generated by combining the signals from the pixel 10 (0, 3), the pixel 10 (0, 5), the pixel 10 (0, 7), the pixel 10 (2, 3), the pixel 10 (2, 5), the pixel 10 (2, 7), the pixel 10 (4, 3), the pixel 10 (4, 5) and the pixel 10 (4, 7) is output to the vertical signal line 30*g* as a pixel signal generated in correspondence to the selection pixel 10 (2, 5).

The B pixel 10 (5, 5), designated as the selection pixel in the pixel block 64 and the B pixels 10 (5, 3) and 10 (5, 7) located in the same row as the B pixel 10 (5, 5) are all connected to the vertical signal line 30*f* via the switch SW1 in the pixel 10 (5, 5), the switch SW5*b* and the switch SW8*b*, in the same way as those described in reference to the pixel blocks 60 through 62. In addition, the FDs 14 at the B pixels 10 (3, 3), 10 (5, 3) and (7, 3) in the fourth column are connected with one another. Likewise, the FDs 14 at the B pixels 10 (3, 5), 10 (5, 5) and 10 (7, 5) in the sixth column are connected with one another and the FDs 14 at the B pixels 10 (3, 7), 10 (5, 7) and 10 (7, 7) in the eighth column are connected with one another. Thus, a signal generated by combining the signals from the pixel 10 (3, 3), the pixel 10 (3, 5), the pixel 10 (3, 7), the pixel 10 (5, 3), the pixel (5, 5), the pixel 10 (5, 7), the pixel 10 (7, 3), the pixel 10 (7, 5) and the pixel 10 (7, 7) is output to the vertical signal line 30*f* as a pixel signal generated in correspondence to the selection pixel 10 (5, 5).

The G pixel 10 (8, 5), designated as the selection pixel in the pixel block 65 and the G pixels 10 (8, 3) and 10 (8, 7) located in the same row as the G pixel 10 (8, 5) are all connected to the vertical signal line 30*e* via the switch SW3*b*, the switch SW6*b* and the switch SW9*b*, in the same way as those described in reference to the pixel blocks 60 through 62. In addition, the FDs 14 at the G pixels 10 (6, 3), 10 (8, 3) and 10 (10, 3) in the fourth column are connected with one another. Likewise, the FDs 14 at the G pixels 10 (6, 5), 10 (8, 5) and 10 (10, 5) in the sixth column are connected with one another and the FDs 14 at the G pixels 10 (6, 7), 10 (8, 7) and 10 (10, 7) in the eighth column are connected with one another. Thus, a signal generated by combining the signals from the pixel 10 (6, 3), the pixel 10 (6, 5), the pixel 10 (6, 7), the pixel 10 (8, 3), the pixel 10 (8, 5), the pixel 10 (8, 7), the pixel 10 (10, 3), the pixel 10 (10, 5) and the pixel 10 (10, 7) is output to the vertical signal line 30*e* as a pixel signal generated in correspondence to the selection pixel 10 (8, 5).

Figure 8:
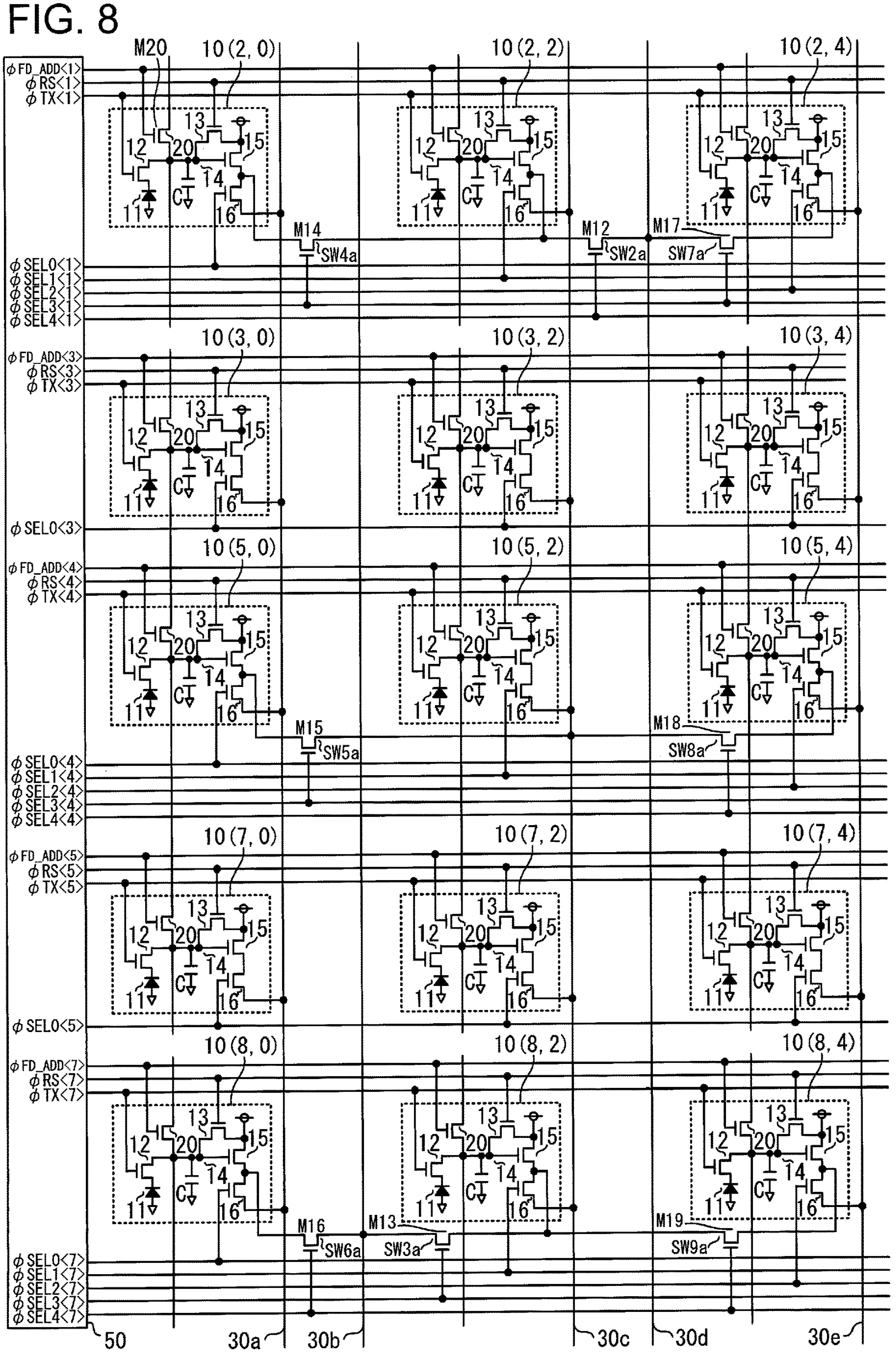
Figure 9:
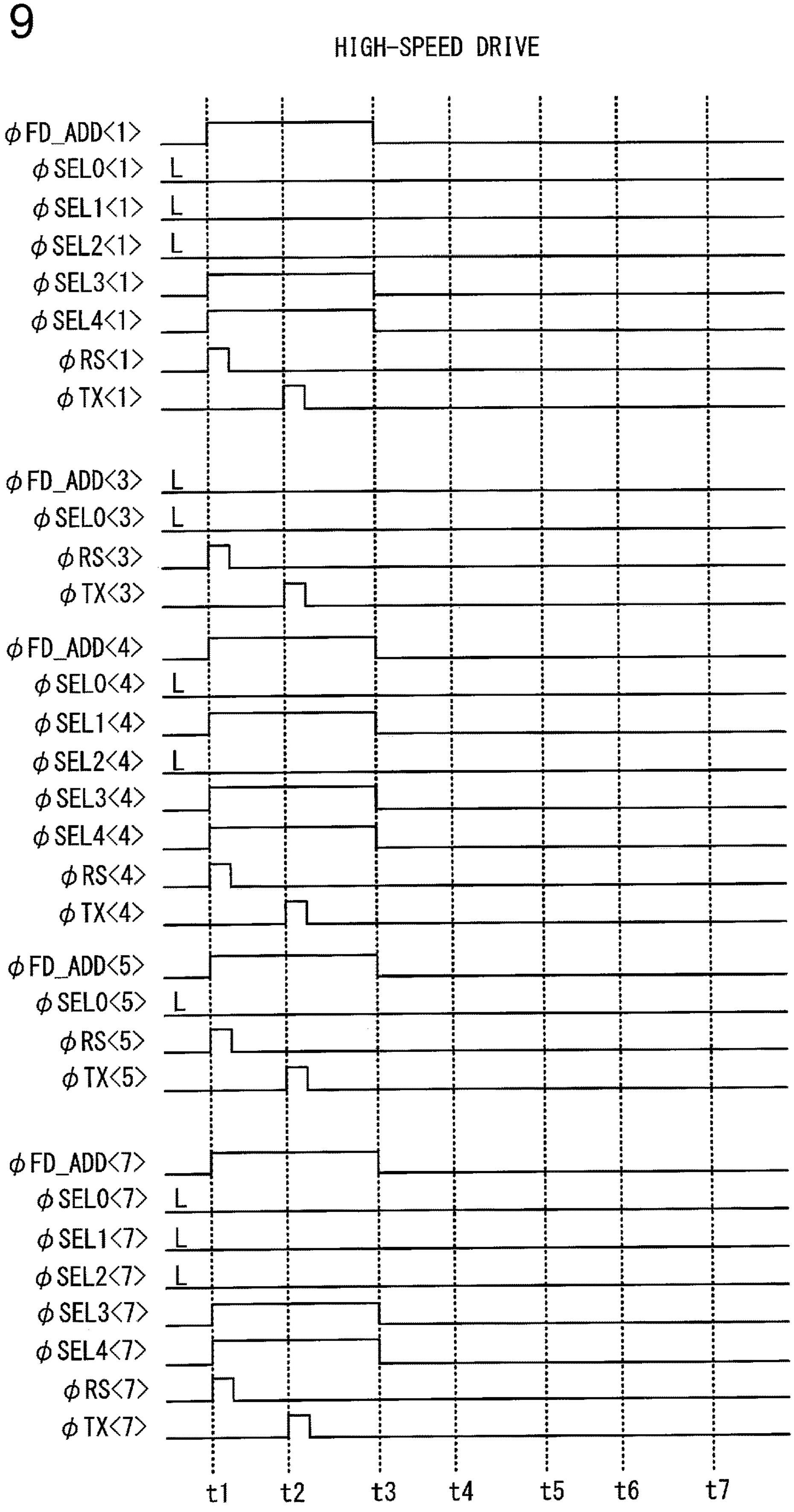

The following is an explanation, given in further detail in reference to FIG. 8 and FIG. 9, of the structure adopted in the image sensor and an operation that may be executed in the image sensor.

FIG. 8 is a circuit diagram illustrating in further detail the circuit structure adopted in the image sensor 3 according to the second embodiment. FIG. 9 is a timing chart illustrating an example of an operation that may be executed in the image sensor3 according to the third control mode. It is to be noted that FIG. 8 only shows some of the plurality of pixels shown in FIG. 7 so as to simplify the illustration. Namely, FIG. 8 only shows the pixel 10 (2, 0), the pixel 10 (2, 2), the pixel 10 (2, 4), the pixel 10 (3, 0), the pixel 10 (3, 2), the pixel 10 (3, 4), the pixel 10 (5, 0), the pixel 10 (5, 2), the pixel 10 (5, 4), the pixel 10 (7, 0), the pixel 10 (7, 2), the pixel 10 (7, 4), the pixel 10 (8, 0), the pixel (8, 2) and the pixel 10 (8, 4).

As shown in FIG. 8, the pixels 10 each include a connection unit 20. Via the connection units 20, each constituted with a transistor M20 controlled with a drive signal øFD_ADD, the FDs 14 of a plurality of pixels 10 disposed consecutively along the column direction are individually connected with one another or disconnected from one another. The vertical drive unit 50 controls the pixels 10 and the switches SW2*a*, SW3*a*, SW4*a*, SW5*a*, SW6*a*, SW7*a*, SW8*a* and SW9*a* by providing the drive signal øRS, the drive signal øTX, the drive signals øSEL0 through øSEL4 and the drive signal øFD_ADD to the pixels 10 and the individual switches.

The switch SW2*a*, constituted with a transistor M12, connects the region between the amplifier unit 15 and the selection unit 16 at the pixel 10 (2, 2) with the vertical signal line 30*d*. The switch SW3*a*, constituted with a transistor M13, connects the region between the amplifier unit 15 and the selection unit 16 at the pixel 10 (8, 2) with the vertical signal line 30*b*.

The switch SW4*a*, constituted with a transistor M14, connects the region between the amplifier unit 15 and the selection unit 16 at the pixel 10 (2, 0) with the region between the amplifier unit 15 and the selection unit 16 at the pixel 10 (2, 2). The switch SW5*a*, constituted with a transistor M15, connects the region between the amplifier unit and the selection unit 16 at the pixel 10 (5, 0) with the vertical signal line 30*c*. The switch SW6*a*, constituted with a transistor M16, connects the region between the amplifier unit 15 and the selection unit 16 at the pixel 10 (8, 0) with the vertical signal line 30*b*.

The switch SW7*a*, constituted with a transistor M17, connects the region between the amplifier unit 15 and the selection unit 16 at the pixel 10 (2, 4) with the vertical signal line 30*d*. The switch SW8*a*, constituted with a transistor M18, connects the region between the amplifier unit 15 and the selection unit 16 at the pixel 10 (5, 4) with the vertical signal line 30*c*. The switch SW9*a*, constituted with a transistor M19, connects the region between the amplifier unit 15 and the selection unit 16 at the pixel 10 (8, 4) with the region between the amplifier unit 15 and the selection unit 16 at the pixel 10 (8, 2).

The timing chart presented in FIG. 9, with time points indicated along the horizontal axis, shows control signals input to the various portions of the image sensor 3 in FIG. 8 in the third control mode. At a time point t1 shown in FIG. 9, the drive signal øFD_ADD <1>, the drive signal øFD_ADD <4>, the drive signal øFD_ADD <5> and the drive signal øFD_ADD <7> are set to high level. As the drive signal øFD_ADD <4> and the drive signal øFD_ADD <5> shift to high level, the transistors M20 constituting the connection units 20 at the pixel 10 (5, 0), the pixel 10 (5, 2), the pixel 10 (5, 4), the pixel (7, 0), the pixel 10 (7, 2) and the pixel 10 (7, 4) enter an ON state. As a result, capacitors C at the FDs 14 in the pixel 10 (3, 0), the pixel 10 (5, 0) and the pixel 10 (7, 0) become electrically connected with one another. Likewise, capacitors C in the pixel 10 (3, 2), the pixel 10 (5, 2) and the pixel 10 (7, 2) become electrically connected with one another and capacitors C in the pixel 10 (3, 4), the pixel 10 (5, 4) and the pixel 10 (7, 4) become electrically connected with one another.

In addition, as the drive signal øFD_ADD <1> shifts to high level, the capacitors C in the pixel 10 (0, 0), the pixel 10 (2, 0) and the pixel 10 (4, 0) shown in FIG. 7 become electrically connected with one another. Similarly, the capacitors C in the pixel 10 (0, 2), the pixel 10 (2, 2) and the pixel 10 (4, 2) become electrically connected with one another and the capacitors C in the pixel 10 (0, 4), the pixel 10 (2, 4) and the pixel 10 (4, 4) become electrically connected with one another. Also, as the drive signal øFD_ADD <7> shifts to high level, the capacitors C in the pixel 10 (6, 0), the pixel 10 (8, 0) and the pixel (10, 0) become electrically connected with one another. Likewise, the capacitors C in the pixel 10 (6, 2), the pixel 10 (8, 2) and the pixel 10 (10, 2) become electrically connected with one another and the capacitors C in the pixel 10 (6, 4), the pixel 10 (8, 4) and the pixel 10 (10, 4) become electrically connected with one another.

In addition, at the time point t1, the drive signal øRS <1>, the drive signal øRS <3>, the drive signal øRS <4>, the drive signal øRS <5> and the drive signal øRS <7> are set to high level. As the drive signal øRS <1> shifts to high level, the transistors M2 constituting the reset units 13 at the pixel 10 (2, 0), the pixel 10 (2, 2) and the pixel 10 (2, 4) enter an ON state, thereby resetting the electric charges in the respective FDs 14. In this situation, since the capacitors C at the three pixels 10 disposed along the column direction are connected as explained earlier, the potentials at the FDs 14 in the pixel 10 (0, 0), the pixel 10 (2, 0) and the pixel 10 (4, 0) are averaged. In addition, the potentials at the FDs 14 in the pixel 10 (0, 2), the pixel 10 (2, 2) and the pixel 10 (4, 2) are averaged and the potentials at the FDs 14 in the pixel 10 (0, 4), the pixel 10 (2, 4) and the pixel 10 (4, 4) are averaged.

As the drive signal øRS <3> shifts to high level, the electric charges in the FDs 14 are reset at the pixel 10 (3, 0), the pixel 10 (3, 2) and the pixel 10 (3, 4). In addition, as the drive signal øRS <4> shifts to high level, the electric charges in the FDs 14 are reset at the pixel 10 (5, 0), the pixel 10 (5, 2) and the pixel 10 (5, 4). As the drive signal øRS <5> shifts to high level, the electric charges in the FDs 14 are reset at the pixel 10 (7, 0), the pixel 10 (7, 2) and the pixel 10 (7, 4). In this situation, since the FDs 14 in the pixel 10 (3, 0), the pixel 10 (5, 0) and the pixel 10 (7, 0) are connected with one another, the potentials at the FDs 14 in the pixel 10 (3, 0), the pixel 10 (5, 0) and the pixel 10 (7, 0) are averaged. Likewise, the potentials at the FDs 14 in the pixel 10 (3, 2), the pixel 10 (5, 2) and the pixel 10 (7, 2) are averaged and the potentials at the FDs 14 in the pixel 10 (3, 4), the pixel (5, 4) and the pixel 10 (7, 4) are averaged.

As the drive signal øRS <7> shifts to high level, the electric charges in the FDs 14 are reset at the pixel 10 (8, 0), the pixel 10 (8, 2) and the pixel 10 (8, 4). In addition, the potentials at the FDs 14 in the pixel 10 (6, 0), the pixel 10 (8, 0) and the pixel 10 (10, 0) are averaged. Likewise, the potentials at the FDs 14 in the pixel 10 (6, 2), the pixel 10 (8, 2) and the pixel 10 (10, 2) are averaged and the potentials at the FDs 14 in the pixel 10 (6, 4), the pixel 10 (8, 4) and the pixel 10 (10, 4) are averaged.

At the time point t1, the drive signal øSEL3 <1>, the drive signal øSEL4 <1>, the drive signal øSEL1 <4>, the drive signal øSEL3 <4>, the drive signal øSEL4 <4>, the drive signal øSEL3 <7> and the drive signal øSEL4 <7> are also set to high level.

As the drive signal øSEL3 <1> shifts to high level, the switch SW4*a* and the switch SW7*a* enter an ON state and as the drive signal øSEL4 <1> shifts to high level, the switch SW2*a* enters an ON state. As a result, the source terminals of the transistors M3 constituting the amplifier units 15 in the pixel 10 (2, 0), the pixel 10 (2, 2) and the pixel 10 (2, 4) become electrically connected to the vertical signal line 30*d*. On the vertical signal line 30*d*, the signal from the pixel 10 (2, 0), the signal from the pixel 10 (2, 2) and the signal from the pixel 10 (2, 4) are combined. Through this process, a signal generated by combining the signals from the nine pixels 10 (0, 0), 10 (0, 2), 10 (0, 4), 10 (2, 0), 10 (2, 2), 10 (2, 4), 10 (4, 0), 10 (4, 2) and 10 (4, 4) is output to the vertical signal line 30*d* as a reset signal in correspondence to the selection pixel 10 (2, 2).

As the drive signal øSEL1 <4> shifts to high level, the transistor M4 constituting the selection unit 16 of the pixel 10 (5, 2) enters an ON state. In addition, as the drive signal øSEL3 <4> shifts to high level, the switch SW5*a* enters an ON state, and as the drive signal øSEL4 <4> shifts to high level, the switch SW8*a* enters an ON state. As a result, the source terminals of the transistors M3 constituting the amplifier units 15 in the pixel 10 (5, 0), the pixel 10 (5, 2) and the pixel 10 (5, 4) become electrically connected to the vertical signal line 30*c*. Through this process, a signal generated by combining the signals from the nine pixels 10 (3, 0), 10 (3, 2), 10 (3, 4), 10 (5, 0), 10 (5, 2), 10 (5, 4), 10 (7, 0), 10 (7, 2) and 10 (7, 4) is output to the vertical signal line 30*c* as a reset signal in correspondence to the selection pixel 10 (5, 2).

As the drive signal øSEL3 <7> shifts to high level, the switch SW3*a* enters an ON state, and as the drive signal øSEL4 <7> shifts to high level, the switch SW6*a* and the switch SW9*a* both enter an ON state. As a result, the source terminals of the transistors M3 constituting the amplifier units 15 in the pixel 10 (8, 0), the pixel 10 (8, 2) and the pixel 10 (8, 4) become electrically connected to the vertical signal line 30*b*. A signal generated by combining the signals from the nine pixels 10 (6, 0), 10 (6, 2), 10 (6, 4), 10 (8, 0), 10 (8, 2), 10 (8, 4), 10 (10, 0), 10 (10, 2) and 10 (10, 4) is thus output to the vertical signal line 30*b* as a reset signal corresponding to the selection pixel 10 (8, 2). The reset signals having been output to the vertical signal lines 30*b* through 30*d* are respectively input to the column circuit units 40*b* through 40*d* shown in FIG. 7 where they are converted to digital signals.

At a time point t2, the drive signal øTX <1>, the drive signal øTX <3>, the drive signal øTX <4>, the drive signal øTX <5> and the drive signal øTX <7> are set to high level. As the drive signal øTX <1> shifts to high level, the transistors M1 constituting the transfer units 12 enter an ON state and the electric charges resulting from photoelectric conversion in the respective photoelectric conversion units 11 are transferred to the FDs 14 in the pixel 10 (2, 0), the pixel 10 (2, 2) and the pixel 10 (2, 4). In this situation, since the capacitors C at the three pixels 10 disposed along the column direction are connected with one another as explained earlier, the electric charges having been generated in the respective photoelectric conversion units 11 at the pixel 10 (0, 0), the pixel 10 (2, 0) and the pixel 10 (4, 0) are distributed to the three capacitors C and the potentials at the FDs 14 are averaged. This may be otherwise described as the electric charges having been generated in the photoelectric conversion units 11 at the pixel 10 (0, 0), the pixel 10 (2, 0) and the pixel 10 (4, 0) being added together and averaged. Likewise, the potentials at the FDs 14 in the pixel 10 (0, 2), the pixel 10 (2, 2) and the pixel 10 (4, 2) are averaged and the potentials at the FDs 14 in the pixel 10 (0, 4), the pixel 10 (2, 4) and the pixel 10 (4, 4) are averaged.

As the drive signal øTX <3> shifts to high level, the electric charges resulting from photoelectric conversion in the photoelectric conversion units 11 are transferred to the FDs 14 in the pixel 10 (3, 0), the pixel 10 (3, 2) and the pixel 10 (3, 4). In addition, as the drive signal øTX <4> shifts to high level, the electric charges resulting from photoelectric conversion in the photoelectric conversion units 11 are transferred to the FDs 14 in the pixel 10 (5, 0), the pixel 10 (5, 2) and the pixel 10 (5, 4). As the drive signal øTX <5> shifts to high level, the electric charges resulting from photoelectric conversion in the photoelectric conversion units 11 are transferred to the FDs 14 in the pixel 10 (7, 0), the pixel 10 (7, 2) and the pixel 10 (7, 4). In this situation, since the FDs 14 in the pixel 10 (3, 0), the pixel 10 (5, 0) and the pixel 10 (7, 0) are connected with one another, the potentials at the FDs 14 in the pixel 10 (3, 0), the pixel 10 (5, 0) and the pixel 10 (7, 0) are averaged. Likewise, the potentials at the FDs 14 in the pixel 10 (3, 2), the pixel 10 (5, 2) and the pixel 10 (7, 2) are averaged, and the potentials at the FDs 14 in the pixel 10 (3, 4), the pixel 10 (5, 4) and the pixel 10 (7, 4) are averaged.

Furthermore, as the drive signal øTX <7> shifts to high level, the electric charges resulting from photoelectric conversion in the photoelectric conversion units 11 are transferred to the FDs 14 in the pixel 10 (8, 0), the pixel 10 (8, 2) and the pixel 10 (8, 4). Also, the potentials at the FDs 14 in the pixel 10 (6, 0), the pixel 10 (8, 0) and the pixel 10 (10, 0) are averaged. Likewise, the potentials at the FDs 14 in the pixel 10 (6, 2), the pixel (8, 2) and the pixel 10 (10, 2) are averaged, and the potentials at the FDs 14 in the pixel (6, 4), the pixel 10 (8, 4) and the pixel 10 (10, 4) are averaged.

In addition, at the time point t2, the drive signal øSEL3 <1> and the drive signal øSEL4 <1> are at high level, and thus, the signal from the pixel 10 (2, 0), the signal from the pixel 10 (2, 2) and the signal from the pixel 10 (2, 4) are combined on the vertical signal line 30*d*. As a result, a signal generated by combining the signals from the nine pixels 10 (0, 0), 10 (0, 2), 10 (0, 4), 10 (2, 0), 10 (2, 2), 10 (2, 4), 10 (4, 0), 10 (4, 2) and (4, 4) is output to the vertical signal line 30*d* as a pixel signal generated in correspondence to the selection pixel 10 (2, 2).

At the time point t2, the drive signal øSEL1 <4> and the drive signal øSEL3 <4> and the drive signal øSEL4 <4> are at high level, and thus, the signal from the pixel 10 (5, 0), the signal from the pixel 10 (5, 2) and the signal from the pixel 10 (5, 4) are combined on the vertical signal line 30*c*. As a result, a signal generated by combining the signals from the nine pixels 10 (3, 0), 10 (3, 2), 10 (3, 4), 10 (5, 0), 10 (5, 2), 10 (5, 4), 10 (7, 0), (7, 2) and 10 (7, 4) is output to the vertical signal line 30*c* as a pixel signal generated corresponding to the selection pixel 10 (5, 2).

Also, at the time point t2, the drive signal øSEL3 <7> and the drive signal øSEL4 <7> are at high level, and thus, the signal from the pixel 10 (8, 0), the signal from the pixel 10 (8, 2) and the signal from the pixel 10 (8, 4) are combined on the vertical signal line 30*b*. As a result, a signal generated by combining the signals from the nine pixels 10 (6, 0), 10 (6, 2), 10 (6, 4), 10 (8, 0), 10 (8, 2), 10 (8, 4), 10 (10, 0), 10 (10, 2) and 10 (10, 4) is output to the vertical signal line 30*b* as a pixel signal generated corresponding to the selection pixel 10 (8, 2).

The pixel signals having been individually output to the vertical signal lines 30*b* through 30*d* are respectively input to the column circuit units 40*b* through 40*d* where they are converted to digital signals. The reset signals and the pixel signals having been converted to digital signals are input to the signal processing unit. The signal processing unit executes signal processing such as correlated double sampling and then outputs the pixel signals having undergone the processing to the control unit 4.

During a time period including and beyond a time point t3, selection pixels, each corresponding to a set of three rows and same-color pixels located around the selection pixels are sequentially selected and reset signals and pixel signals are read out in the same way as the signal readout executed during the time period elapsing between the time point t1 and the time point t3. In the third control mode described above, selection pixels are sequentially selected in units of three rows and thus, pixel signals can be simultaneously read out in correspondence to a plurality of rows. In addition, signals, each generated by combining the signal from a selection pixel with signals from the same-color pixels located around the selection pixel, can be read out as pixel signals generated in correspondence to the selection pixels.

In addition to the advantageous effects of the first embodiment, the following advantageous effects can be achieved through the embodiment described above.

(4) The image sensor 3 includes a third connection unit 20 that connects/disconnects the accumulating unit 14 of the first pixel with/from the accumulating unit 14 of another pixel different from the first pixel and the second pixel. The control unit 50 executes control so as to output a signal generated based upon an electric charge representing the sum of the electric charges generated in the photoelectric conversion units 11 of the first pixel and the other pixel to the first signal line by setting the third connection unit 20 in a connected state. This structure makes it possible to read out a signal generated based upon an electric charge calculated by adding together and averaging electric charges resulting from photoelectric conversion at a plurality of pixels 10 to a vertical signal line 30. As a result, a signal generated by combining a signal from a selection pixel and signals from same-color pixels located around the selection pixel can be read out to the vertical signal line 30. In addition, since image data are generated based upon pixel signals each generated by combining signals, the occurrence of noise, such as moire fringe, in an image can be prevented.

(5) The control unit 50 executes control so as to output a signal from the first pixel to the first signal line and also output a signal from another pixel different from the first pixel and the second pixel to the first signal line. In the present embodiment, the control unit 50 executes control so as to output, for instance, the signal from the pixel 10 (2, 0), the signal from the pixel 10 (2, 2) and the signal from the pixel 10 (2, 4) simultaneously to the vertical signal line 30*d*. Thus, the image sensor 3 is able to combine the signal from the pixel 10 (2, 0), the signal from the pixel 10 (2, 2) and the signal from the pixel 10 (2, 4) on the vertical signal line 30*d*.

The following variations are also within the scope of the present invention, and one of the variations or a plurality of variations may be adopted in combination with either of the embodiments described above.

Variation 1

In the embodiments described above, selection pixels are selected in sequence, each in units of three rows and pixel signals are simultaneously read out in unit of three rows. However, selection pixels may be sequentially selected, each in of two rows, and pixel signals may be simultaneously read out in unit of two rows. In such a case, operations of the A/D conversion units disposed in correspondence to the vertical signal lines to which no pixel signals are read out may be halted so as to reduce the power consumption at the image sensor.

Variation 2

In the second embodiment described above, the FDs 14 in a plurality of pixels disposed along the column direction are connected with one another and a plurality of pixels disposed along the row direction are connected to the same vertical signal line 30 so as to combine signals from the plurality of pixels disposed along the column direction and signals from the plurality of pixels disposed along the row direction. However, signals may be combined through a method other than this. For instance, the FDs 14 at a plurality of pixels disposed along the row direction may connected with one another and a plurality of pixels disposed along the column direction may be connected to the same vertical signal line 30 in order to combine the signals from the plurality of pixels. As a further alternative, signals from a plurality of pixels may be combined by connecting the FDs 14 in a plurality of pixels disposed along the row direction and the FDs 14 in a plurality of pixels disposed along the column direction.

Variation 3

In the embodiment described above, switches SW2*a* through SW9*a* and switches SW2*b* through SW9*b* are disposed at the image sensor 3. However, any number of switches may be disposed at the image sensor 3. A greater number of switches may be disposed so as to allow pixel signals from any number of pixels disposed within the same column to be simultaneously read out to vertical signal lines different from one another. For instance, assuming that a selection pixel is selected at a rate of one pixel in five× five=25 pixels, the pixel signals from five selection pixels within the same column may be read out to different vertical signal lines (e.g., vertical signal lines 30*a* through 30*e*). In such a case, the length of time required for pixel signal readout is reduced to approximately ⅕ of the length of time required when sequentially reading out pixel signals from the individual pixels in the same column to a single vertical signal line and thus, the frame rate can be improved by a factor of five.

Variation 4

In the embodiments and variations thereof, R pixels, G pixels and B pixels are disposed at the image sensor 3. However, W pixels each having a W (white) filter and BK pixels each having a BK (black) filter may be disposed.

Variation 5

In the embodiments described above, the photoelectric conversion units are each constituted with a photodiode. As an alternative, photoelectric conversion units each constituted with a photoelectric conversion film may be used.

Variation 6

The image sensor and the image-capturing device having been described in reference to the embodiments and the variations thereof may be adopted in a camera, a smart phone, a tablet, a built-in camera in a PC, an on-vehicle camera, a camera installed in an unmanned aircraft (such as a drone or a radio-controlled airplane) and the like.

Variation 7

The image sensor, having been described in reference to the embodiments and variations thereof, may be adopted in a laminated sensor (laminated image sensor) configured by laminating a plurality of substrates (e.g., a plurality of semiconductor substrates). For instance, the plurality of pixels 10 may be disposed at a first-layer substrate, the column circuits 40 and the vertical drive unit 50 may be disposed at a second-layer substrate and the plurality of vertical signal lines 30 may be disposed between the first-layer substrate and the second-layer substrate. As an alternative, the plurality of pixels 10 and the vertical drive unit 50 may be disposed at the first-layer substrate and the column circuits 40 may be disposed at the second-layer substrate. Furthermore, the laminated sensor may include three or more layers.

While the embodiments and variations thereof have been described, the present invention is not limited to the particulars of these examples. Any other mode conceivable within the scope of the technical teaching of the present invention is also within the scope of the present invention.

The disclosure of the following priority application is herein incorporated by reference:

Japanese Patent Application No. 2017-65777 filed Mar. 29, 2017

REFERENCE SIGNS LIST

3 image sensor, 4 control unit, 10 pixel, 11 photoelectric conversion unit, 30 vertical signal line, 50 vertical drive unit.

The invention claimed is:

1. An image sensor comprising:

a pixel unit including a plurality of pixels and in which a first pixel and a second pixel are arranged along a row direction, a third pixel is arranged in line with the first pixel in a colunm direction, and a fourth pixel is arranged in line with the first pixel in the row direction, the first pixel (i) including a first photoelectric conversion unit that converts light to a charge and (ii) outputting a first signal based on the charge photoelectrically converted by the first photoelectric conversion unit, the second pixel (i) including a second photoelectric conversion unit that converts light to a charge and (ii) outputting a second signal based on the charge photoelectrically converted by the second photoelectric conversion unit, the third pixel (i) including a third photoelectric conversion unit that converts light to a charge and (i) outputting a third signal based on the charge photoelectrically converted by the third photoelectric conversion unit, and the fourth pixel (i) including a fourth photoelectric conversion unit that converts light to a charge and (ii) outpatting a fourth signal based on the charge photoelectrically converted by the fourth photoelectric conversion unit;

a first signal line electrically connected to the first pixel;

a second signal line electrically connected to the second pixel;

a third signal line electrically connected to the fourth pixel;

a circuit unit including a first A/D conversion unit that is electrically connected to the first signal line and converts an analog signal into a digital signal, and a second A/D conversion unit that is electrically connected to the second signal line and converts an analog signal into a digital signal;

a first connection unit for electrically connecting the first pixel and the second signal line and that includes a first switch unit arranged within the pixel unit between two adjacent pixels of the plurality of pixels included in the pixel unit;

a second connection unit for electrically connecting the third pixel and the third signal line and including a second switch unit arranged within the pixel unit, and a control unit that controls, during a signal readout period for the first and second pixels, the first pixel and the second pixel so as to cause the first signal to be output from the first pixel to the second signal line via the first connection unit, and so as to cause the second signal not to be output from the second pixel, wherein the control unit controls, during the signal readout period, the third pixel so as to cause the third signal to be output from the third pixel to the third signal line via the second connection unit.

2. The image sensor according to claim 1, wherein during the signal readout period, the control unit controls the first pixel and the second pixel so as to cause only the first signal, of the first signal and the second signal, to be output to the second signal line.

3. The image sensor according to claim 2, wherein the third pixel is electrically connected to the first signal line, and the control unit controls the third pixel so as to cause the third signal to be output from the third pixel to the first signal line during the signal readout period.

4. The image sensor according to claim 3, wherein the first pixel has a first filter having a first spectral characteristic;

the third pixel has a second filter having a second spectral characteristic;

the first photoelectric conversion unit converts light transmitted through the first filter; and the third photoelectric conversion unit converts light transmitted through the second filter.

5. The image sensor according to claim 4, wherein the control unit controls the third pixel so that the third signal is output to the first signal line when the first signal is output to the second signal line during the signal readout period.

6. The image sensor according to claim 5, wherein the control unit controls the third pixel so that a timing at which the third signal is output to the first signal line is the same as a timing at which the first signal is output to the second signal line during the signal readout period.

7. The image sensor according to claim 1, wherein the first pixel has a first filter having a first spectral characteristic;

the third pixel has a second filter having a second spectral characteristic;

the first photoelectric conversion unit converts light transmitted through the first filter; and the third photoelectric conversion unit converts light transmitted through the second filter.

8. The image sensor according to claim 7, wherein the control unit controls the third pixel so that the third signal is output to the third signal line when the first signal is output to the second signal line during the signal readout period.

9. The image sensor according to claim 8, wherein the control unit controls the third pixel so that a timing at which the third signal is output to the third signal line is the same as a timing at which the first signal is output to the second signal line during the signal readout period.

10. The image sensor according to claim 1, wherein the control unit executes, during the signal readout period, one of (i) a first mode that controls the first pixel and the second pixel so as to cause the first signal to be output from the first pixel to the second signal line via the first connection unit and so as cause the second signal not to be output from the second pixel and (ii) a second mode that controls the first pixel and the second pixel so as to cause the first signal to be output from the first pixel to the first signal line and so as to cause the second signal to be output from the second pixel to the second signal line.

11. The image sensor according to claim 10, wherein the third pixel is electrically connected to the first signal line, and the control unit controls the third pixel so as to cause the third signal to be output from the third pixel to the first signal line in the first mode.

12. The image sensor according to claim 11, wherein the first pixel has a first filter having a first spectral characteristic;

the third pixel has a second filter having a second spectral characteristic;

the first photoelectric conversion unit converts light transmitted through the first filter; and the third photoelectric conversion unit converts light transmitted through the second filter.

13. The image sensor according to claim 12, wherein the control unit controls the third pixel so that the third signal is output to the first signal line when the first signal is output to the second signal line in the first mode.

14. The image sensor according to claim 13, wherein the control unit controls the third pixel so that a timing at which the third signal is output to the first signal line is the same as a timing at which the first signal is output to the second signal line in the first mode.

15. The image sensor according to claim 10, wherein the control unit controls the third pixel so as to cause the third signal to be output from the third pixel to the third signal line via the second connection unit in the first mode.

16. The image sensor according to claim 15, wherein the first pixel has a first filter having a first spectral characteristic;

the third pixel has a second filter having a second spectral characteristic;

the first photoelectric conversion unit converts light transmitted through the first filter; and the third photoelectric conversion unit converts light transmitted through the second filter.

17. The image sensor according to claim 16, wherein the control unit controls the third pixel so that the third signal is output to the third signal line when the first signal is output to the second signal line in the first mode.

18. The image sensor according to claim 17, wherein the control unit controls the third pixel so that a timing at which the third signal is output to the third signal line is the same as the timing at which the first signal is output to the second signal line in the first mode.

19. The image sensor according to claim 1, wherein the first pixel has a first selection transistor for electrically connecting with the first signal line, the second pixel has a second selection transistor for electrically connecting with the second signal line, the first switch unit has a first connection transistor for electrically connecting the first pixel and the second signal line, the control unit controls the first selection transistor and the second selection transistor to an OFF state during the signal readout period, and the control unit controls the first connection transistor to an ON state during the signal readout period.

20. An imaging device comprising the image sensor according to claim 1.

* * * * *